(12) United States Patent
Liu et al.

(10) Patent No.: US 11,552,762 B2
(45) Date of Patent: Jan. 10, 2023

(54) RESOURCE ALLOCATING METHOD FOR DEMODULATION REFERENCE SIGNAL AND BASE STATION

(71) Applicant: NTT DOCOMO, INC., Tokyo (JP)

(72) Inventors: Juan Liu, Beijing (CN); Wenjia Liu, Beijing (CN); Runxin Wang, Beijing (CN); Xin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/257,181

(22) PCT Filed: Aug. 10, 2018

(86) PCT No.: PCT/CN2018/099874
§ 371 (c)(1),
(2) Date: Dec. 30, 2020

(87) PCT Pub. No.: WO2020/029228
PCT Pub. Date: Feb. 13, 2020

(65) Prior Publication Data
US 2021/0184808 A1    Jun. 17, 2021

(51) Int. Cl.
*H04L 5/00* (2006.01)
*H04W 72/04* (2009.01)
*H04L 12/54* (2022.01)

(52) U.S. Cl.
CPC ............ *H04L 5/005* (2013.01); *H04L 5/0037* (2013.01); *H04W 72/044* (2013.01); *H04L 12/5692* (2013.01)

(58) Field of Classification Search
CPC ......... H04L 2012/5631; H04L 12/5692; H04L 5/0048; H04L 5/005; H04L 5/003;
(Continued)

(56) References Cited

U.S. PATENT DOCUMENTS

| 10,506,571 B2* | 12/2019 | Kim | ........................ H04L 1/02 |
| 2012/0163335 A1* | 6/2012 | Chung | ................. H04L 5/0023 370/329 |

(Continued)

FOREIGN PATENT DOCUMENTS

| CN | 106856426 A | 6/2017 | |
| CN | 108023697 A | 5/2018 | |
| KR | 2014012997 | * 11/2014 | ............. H04L 27/26 |

OTHER PUBLICATIONS

International Search Report issued in PCT/CN2018/099874, dated Apr. 28, 2019 (2 pages).

*Primary Examiner* — Warner Wong
(74) *Attorney, Agent, or Firm* — Osha Bergman Watanabe & Burton LLP

(57) ABSTRACT

Disclosed are a resource allocation method for demodulation reference signals and a base station. The resource allocation method for demodulation reference signals executed by the base station includes: determining an allocation method for a resource required for transmitting a plurality of demodulation reference signals and a parameter for generating the plurality of demodulation reference signals, the plurality of demodulation reference signals respectively corresponding to a plurality of user equipments, the allocation method being capable of supporting transmission of the plurality of demodulation reference signals on the same time domain resource, and the parameter being capable of making the demodulation reference signals sent with the same time frequency resource distinguished from each other; and transmitting information indicating the allocation method and information indicating the parameter to the plurality of user equipments.

12 Claims, 16 Drawing Sheets

(58) Field of Classification Search
CPC . H04L 5/0037; H04L 27/261; H04L 27/2613; H04L 27/2655; H04L 2025/03783; H04L 2025/03796; H04L 47/76; H04W 72/04; H04W 72/044; H04W 56/00; H04W 56/0005; H04W 56/001; H04W 72/00
See application file for complete search history.

(56) References Cited

U.S. PATENT DOCUMENTS

| | | | | |
|---|---|---|---|---|
| 2012/0213191 | A1* | 8/2012 | Park | H04L 5/0023 370/329 |
| 2012/0213311 | A1* | 8/2012 | Park | H04L 5/0051 375/295 |
| 2013/0155982 | A1* | 6/2013 | Gaal | H04L 5/0037 370/329 |
| 2014/0269519 | A1* | 9/2014 | Shan | H04L 5/0053 370/329 |
| 2016/0212746 | A1* | 7/2016 | Wang | H04W 72/1289 |
| 2017/0264408 | A1* | 9/2017 | Patel | H04L 5/0051 |
| 2017/0289924 | A1* | 10/2017 | Fu | H04W 52/246 |
| 2017/0317808 | A1* | 11/2017 | You | H04L 5/10 |
| 2018/0006864 | A1* | 1/2018 | Hwang | H04L 27/2613 |
| 2018/0152938 | A1* | 5/2018 | Miao | H04L 1/18 |
| 2018/0192321 | A1* | 7/2018 | Sahlin | H04L 27/2607 |
| 2018/0212728 | A1* | 7/2018 | Wang | H04W 72/14 |
| 2018/0278395 | A1* | 9/2018 | Yoon | H04L 5/0048 |
| 2019/0052425 | A1* | 2/2019 | Kim | H04L 5/0064 |
| 2019/0069282 | A1* | 2/2019 | Luo | H04W 72/048 |
| 2019/0165873 | A1* | 5/2019 | Zhang | H04J 1/08 |
| 2019/0260527 | A1 | 8/2019 | Wu et al. | |
| 2020/0007303 | A1* | 1/2020 | Ren | H04W 72/04 |
| 2020/0266963 | A1 | 8/2020 | Song et al. | |
| 2021/0168837 | A1* | 6/2021 | Matsumura | H04B 1/713 |
| 2021/0242990 | A1* | 8/2021 | Baldemair | H04W 72/0453 |
| 2021/0306191 | A1* | 9/2021 | Lin | H04L 1/0071 |
| 2021/0314984 | A1* | 10/2021 | Yang | H04L 5/0078 |

\* cited by examiner

RESOURCE ALLOCATING METHOD FOR DEMODULATION REFERENCE SIGNAL AND BASE STATION

FIELD OF THE INVENTION

This disclosure relates to field of communication, and more specifically, to a resource allocating method for demodulation reference signal and a base station for executing the method.

BACKGROUND OF THE INVENTION

As the next generation cellular network, 5G network is based on 5G NR (New Radio). A global 5G standard based on brand new air interface of OFDM aim to support various kinds of 5G apparatus, services, deployments and frequency bands. As compared to 4G communication, 5G communication is able to provide signal of broader coverage, and faster velocity for networking, and larger traffic density, and to penetrate into internet of things at the same time. In other words, it is internet of everything.

To guarantee so many connections and such high efficient and reliable transmission, a conventional uplink communication is obviously ineligible, and new key technique of 5G is needed to support, and a non-orthogonal multi-address technique (NOMA technique) is an importance key technique of 5G.

In a conventional transmission mode (pattern) of NR Demodulation Reference Signal (DMRS), at a same time domain resource, a transmission of demodulation reference signal corresponding to up to twelve ports (that is, twelve user equipment (UE) can be supported. However, this is far from enough in NOMA.

SUMMARY OF THE INVENTION

In view of the above situation, it is desired to provide a method capable of supporting transmission of demodulation reference signal of more ports as compared to conventional method on same time frequency resource and a base station for executing the method.

According to one aspect of this invention, there provides a resource allocating method for demodulation reference signals executed by a base station, including: determining an allocating mode of resource required for transmitting a plurality of demodulation reference signals and parameters for generating the plurality of demodulation reference signals, wherein the plurality of demodulation reference signals are corresponding to a plurality of user equipment respectively, and the allocating mode is able to support transmitting the plurality of demodulation reference signals on same time domain resource, and the parameters are able to make the demodulation reference signals transmitted on same time frequency resource to be distinguished from each other; and transmitting information indicating the allocating mode and information indicating the parameters to the plurality of user equipment.

According to another aspect of this invention, there provides a base station for executing resource allocation for demodulation reference signals including: a determining unit for determining an allocating mode of resource required for transmitting a plurality of demodulation reference signals and parameters for generating the plurality of demodulation reference signal, wherein the plurality of demodulation reference signals are corresponding to a plurality of user equipment respectively, and the allocating mode is able to support transmitting the plurality of demodulation reference signals on same time domain resource, and the parameters are able to make the demodulation reference signals transmitted on same time frequency resource to be distinguished from each other; and a communication unit for transmitting information indicating the allocating mode and information indicating the parameters to the plurality of user equipment.

DETAIL DESCRIPTION OF THE INVENTION

The respective preferable embodiments of this disclosure are described with reference to the accompanying drawings hereinafter. The description with reference to the accompanying drawings is provided hereinafter to help to understand the exemplary embodiments of this disclosure defined by the claim or the equivalent. It includes various kinds of specific details helping understanding, and they are only regarded as exemplary. Therefore, those skilled in the art would recognize that the embodiments described here can be made various kinds of alternation and modification without departing from the range and spirit of this disclosure. Further, in order to make the specification more clear and brief, the detailed description on the well-known functions and structures in the art would be omitted.

Figure 1:
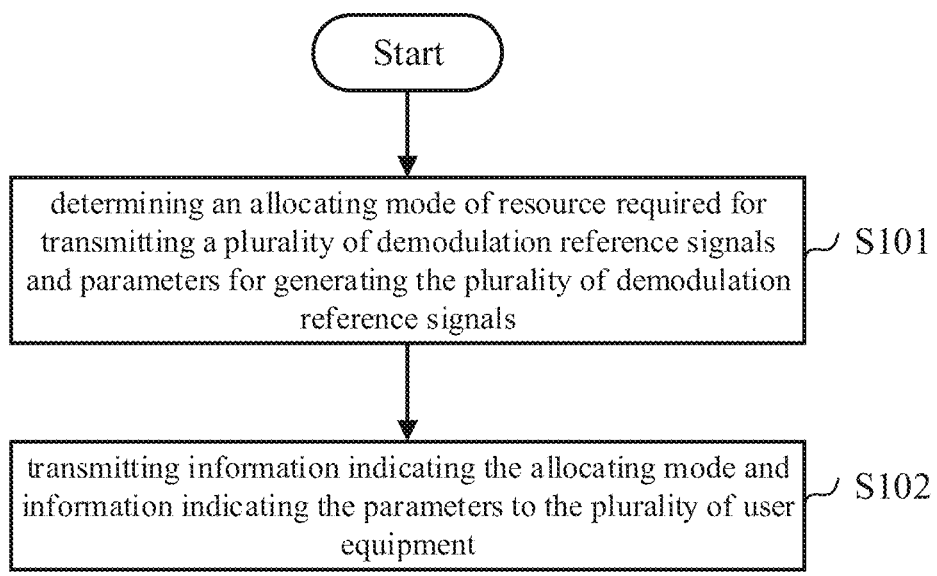
FIG. 1 is a flow chart illustrating a resource allocating method for demodulation reference signal executed by a base station according to an embodiment of the disclosure.

First, a resource allocating method for demodulation reference signal executed by a base station according to an embodiment of the invention is described with reference to FIG. 1. As shown in FIG. 1, the method includes the following steps.

At first, at step S101, an allocating mode of resource required for transmitting a plurality of demodulation reference signal and parameters for generating the plurality of demodulation reference signal are determined, wherein the plurality of demodulation reference signal correspond to a plurality of user equipment respectively, and the allocating mode is able to support transmitting the plurality of demodulation reference signals on one same time domain resource, and the parameters are able to make demodulation reference signals transmitted on same time frequency resource to be distinguished from each other.

Then, at step S102, information indicating the allocating mode and information indicating the parameters is transmitted to the plurality of user equipment.

Here, it needs to be noted that, the demodulation reference signal may be a signal for uplink or a signal for downlink.

In particular, when the demodulation reference signal is uplink demodulation reference signal, at step S101, a resource allocating mode required for transmitting demodulation reference signal to a base station by user equipment and parameters for generating demodulation reference signal at user equipment side are determined. At step S102, the information indicating the allocating mode is transmitted to the plurality of user equipment, so that the user equipment can know that which resources are to be used to transmit its own demodulation reference signal. And, the information indicating the parameters is transmitted to the user equipment, so that the user equipment can generate demodulation reference signal to be transmitted based on these parameters.

On the other hand, when the demodulation reference signal is downlink demodulation reference signal, at step S101, a resource allocating mode required for transmitting demodulation reference signal to user equipment by a base station and parameters for generating demodulation reference signal at base station side are determined. At step S102, the information indicating the allocating mode is transmitted to the plurality of user equipment, so that the user equipment can know that demodulation reference signal transmitted by the base station using which resource is the demodulation reference signal being to themselves. And, the information indicating the parameters is transmitted to the user equipment, so that the user equipment is able to know that the received demodulation reference signal is generated based on which parameters.

In a conventional mode of NR DMRS, a maximum number of user equipment corresponding to the plurality of demodulation reference signal transmitted by occupying one same time domain resource is twelve. And in a mode of DMRS according to this invention, a maximum number of user equipment corresponding to the plurality of demodulation reference signal transmitted by occupying one same time domain resource would be larger than twelve.

Before describing specific embodiments according to this invention, in order to better understand a difference between this disclosure and prior arts, several conventional NR DMRS modes would be described with reference to FIGS. 2 and 3 firstly.

Figure 2A:
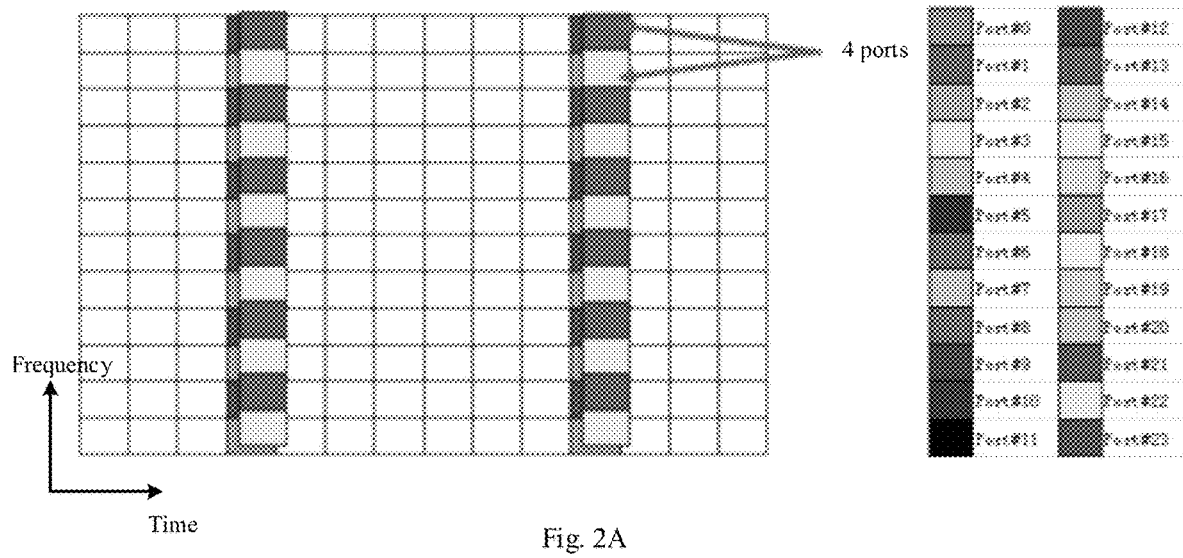
FIG. 2A and FIG. 2B show a NR DMRS mode 1 according to prior arts.
Figure 2B:
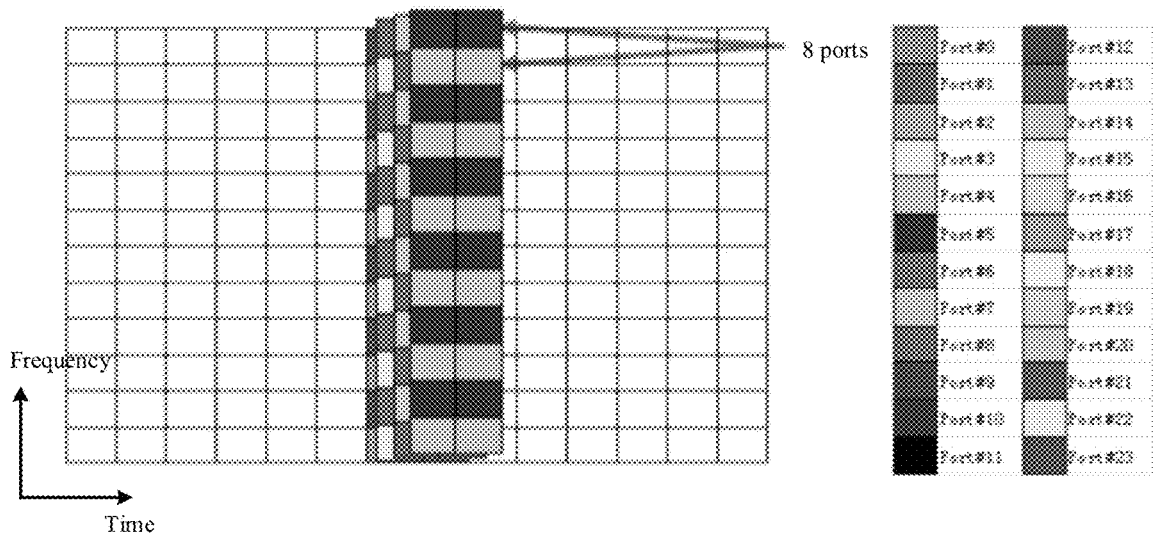

FIG. 2A and FIG. 2B illustrate a NR DMRS mode 1 according to prior arts; here, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented in different grey levels in the drawing.

FIG. 2A illustrates a case of transmitting DMRS signal by using one OFDM symbol. It can be seen from FIG. 2A that, DMRS signal (front-loaded DMRS) is transmitted at the fourth symbol, and DMRS signal (additional DMRS) is also transmitted at the eleventh symbol. Generally, the DMRS signal transmitted at these two positions are same to improve accuracy of data. In FIG. 2A, at the same time domain resource location, DMRS signal corresponding to two ports are transmitted alternately by different REs (comb REs). Further, in FIG. 2A, two DMRS signals are shown overlapped at one same time domain resource location. These two pieces of DMRS signal is distinguished by orthogonal sequence. For example, a mode generating the orthogonal sequence may be a mode of cyclic shift (CS). Therefore, in FIG. 2A, the DMRS signal of four user equipment can be supported to be transmitted on one same time domain resource.

FIG. 2B illustrates a case of transmitting DMRS signal by using two OFDM symbols. It can be seen from FIG. 2B that, DMRS signal is transmitted at the seventh and eighth symbols. In FIG. 2B, at the same time domain resource location, DMRS signal corresponding to 2 ports are transmitted alternately by different REs (comb REs). Further, in FIG. 2B, four pieces of DMRS signal are shown overlapped at the same time domain resource location. These four pieces of DMRS signal are distinguished by orthogonal sequence and time domain orthogonal cover code (TD-OCC). For example, a mode generating the orthogonal sequence may be a mode of cyclic shift (CS). Therefore, in FIG. 2B, the DMRS signal of 8 user equipment can be supported to be transmitted on same time domain resource.

Figure 3A:
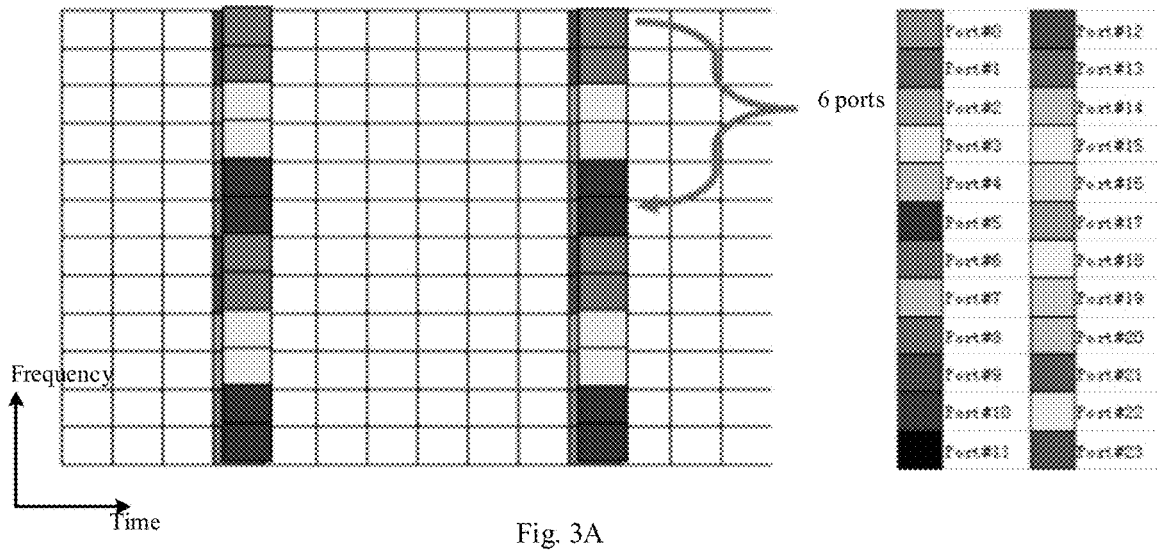
FIG. 3A and FIG. 3B show a NR DMRS mode 2 according to prior arts.
Figure 3B:
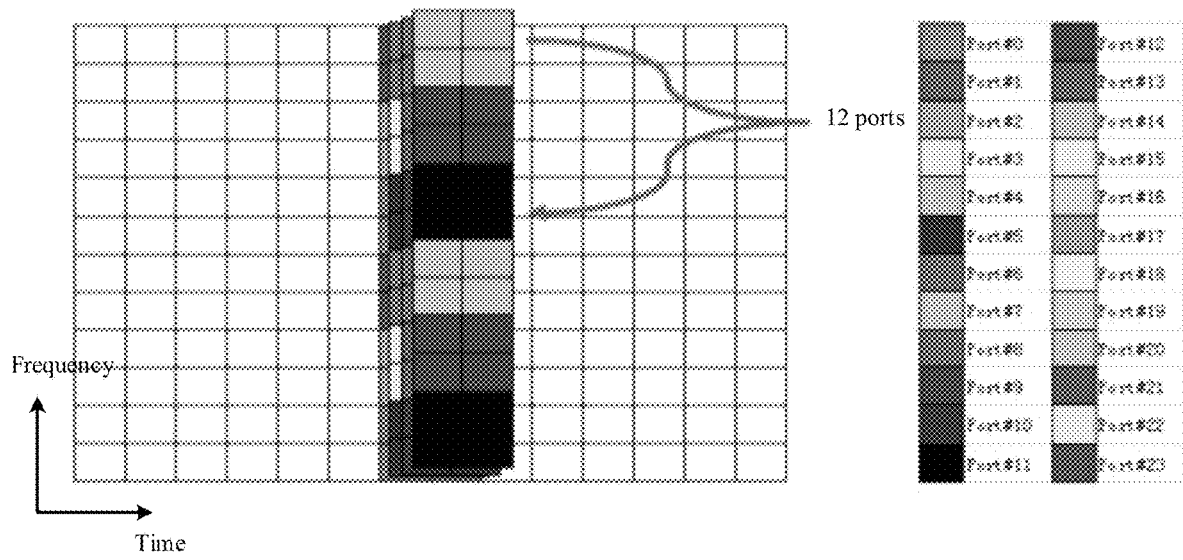

FIG. 3A and FIG. 3B illustrate a NR DMRS mode 2 according to prior arts; similar to FIG. 2A and FIG. 2B, in FIG. 3A and FIG. 3B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented in different grey levels in the drawing.

FIG. 3A illustrates a case of transmitting DMRS signal by using one OFDM symbol. It can be seen from FIG. 3A that, DMRS signal (front-loaded DMRS) is transmitted at the fourth symbol, and DMRS signal (additional DMRS) is also transmitted at the eleventh symbol. Generally, the DMRS signal transmitted at these two locations are same to improve accuracy of data. In FIG. 3A, at one same time domain resource location, DMRS signal corresponding to one ports is transmitted by adjacent two REs (adjacent REs), and DMRS signal corresponding to three ports is transmitted alternately every two REs. Further, in FIG. 3A, two pieces of DMRS signal are shown overlapped at one same time domain resource location. These two pieces of DMRS signal are distinguished by orthogonal sequence. For example, a manner for generating orthogonal sequence may be a manner of adding frequency domain orthogonal cover code (FD-OCC). Therefore, in FIG. 3A, the DMRS signal of 6 user equipment can be supported to be transmitted on same time domain resource.

FIG. 3B illustrates a case of transmitting DMRS signal by using two OFDM symbols. It can be seen from FIG. 3B that, DMRS signal is transmitted at the seventh and eighth symbols. In FIG. 3B, at the same time domain resource location, DMRS signal corresponding to one port is transmitted by adjacent two REs (adjacent REs), and DMRS signals corresponding to three ports are transmitted alternately every two REs. Further, in FIG. 3B, four DMRS signals are shown overlapped at the same time domain resource location. These four DMRS signals are distinguished by orthogonal sequence and time domain orthogonal cover code (TD-OCC). For example, a manner for generating orthogonal sequence may be a manner of adding frequency domain orthogonal cover code (FD-OCC). Therefore, in FIG. 3B, the DMRS signals of twelve user equipment can be supported to be transmitted on same time domain resource.

It can be seen that, in the conventional DMRS mode, DMRS signal of up to twelve user equipment can be supported to be transmitted on same time domain resource.

Next, several specific embodiments according to this invention are described respectively.

First Embodiment

Figure 4:
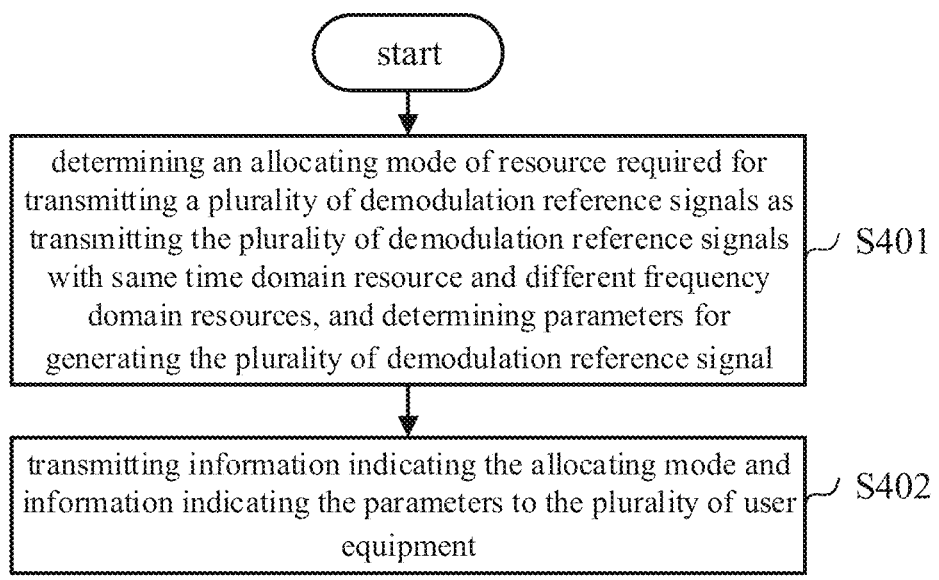
FIG. 4 is a flow chart illustrating a procedure of a resource allocating method for demodulation reference signal executed by a base station according to a first embodiment of this disclosure.

FIG. 4 illustrates a resource allocating method for demodulation reference signal executed by a base station according to the first embodiment of this disclosure. As shown in FIG. 4, the method includes the following steps.

First, at step S401, an allocating mode of resource required for transmitting a plurality of demodulation reference signal is determined as transmitting the plurality of demodulation reference signal by same time domain resource and different frequency domain resource, and parameters for generating the plurality of demodulation reference signal are determined, here, the plurality of demodulation reference signals are corresponding to a plurality of user equipment respectively, and the allocating mode is able to support transmitting the plurality of demodulation reference signal on same time domain resource, and the parameters are able to make the demodulation reference signal transmitted by the same time frequency resource to be distinguished from each other.

That is, in the first embodiment, DMRS signals of different user equipment can be transmitted in a sparser mode in frequency domain, that is, DMRS signals of more user equipment are transmitted in the frequency domain. For example, in the prior arts, DMRS signals of two user equipment is transmitted alternately in the frequency domain, and in the first embodiment, DMRS signals of three or more user equipment are transmitted alternately in the frequency domain. Therefore, the first embodiment can be regarded as an embodiment for increasing number of user equipment supported in the frequency domain.

In the first embodiment, several sparse modes improved based on the above-mentioned DMRS mode 1 DMRS mode 2 are described as example. Hereinafter, the several sparse modes are described in an order of formula derivation, DMRS configuration parameter table and schematic view of DMRS resource allocation.

First, DMRS signal is generated by the following manner. In case that transform pre-coding is disabled, a pseudo-random sequence (PN sequence) is used as DMRS signal r(n). A specific formula is as follows:

$$r(n) = \frac{1}{\sqrt{2}}(1 - 2 \cdot c(2n)) + j\frac{1}{\sqrt{2}}(1 - 2 \cdot c(2n+1))$$

Here, the pseudo-random sequence c(i) is initialized by the following formula.

$$c_{init} = \left(2^{17}\left(N_{symb}^{slot}n_{s,f}^{\mu} + l + 1\right)\left(2N_{ID}^{n_{SCID}} + 1\right) + 2N_{ID}^{n_{SCID}} + n_{SCID}\right) \bmod 2^{31}$$

In case that transform pre-coding is enabled, a ZC sequence is used as DMRS signal r(n). A specific formula is as follows:

$$r(n) = r_{u,v}^{(\alpha,\delta)}(n)$$

$$n = 0, 1, \ldots, M_{sc}^{PUSCH} - 1$$

In the first embodiment, the parameters determined at step S401 include not only $N_{ID}^{n_{SCID}}$ (PN sequence) or $N_{ID}^{RS}$ (ZC sequence) for generating the DMRS signal, but also a parameter for distinguishing among ports corresponding to the demodulation reference signals transmitted on the same time frequency resource (for example, distinguishing between several columns overlapped as shown in FIG. 2A to FIG. 3B), for example, FD-OCC. And, in the first embodiment, the $N_{ID}^{n_{SCID}}$ (PN sequence) or the ND (ZC sequence) for generating the DMRS signal determined at step S401 are same for all user equipment.

For the k-th sub-carrier and l-th RE (a direction of time axis), DMRS signal corresponding thereto is calculated according to the following formula:

$$\tilde{a}_{k,l}^{(\tilde{p}_j,\mu)} = w_f(k')w_t(l')r(2n + k')$$

$$k' = 0, 1$$

$$l = \bar{l} + l'$$

$$n = 0, 1, \ldots$$

$$j = 0, 1, \ldots, v - 1$$

Here, $w_f(k')$ and $w_t(l')$ represent frequency domain OCC and time domain OCC respectively.

The above formula and meaning of symbols are same as in 3GPP TS 38.211 standard.

Here, in the conventional 3GPP TS 38.211 standard, for the DMRS mode 1 above-described with reference to FIGS. 2A-2B, the value of k is as follows:

$$k=4n+2k'+\Delta$$

Here, $\Delta$ is a fixed value introduced for mapping k appropriately.

And, for the DMRS mode 2 above-described with reference to FIGS. 3A-3B, the value of k is as follows:

$$k=6n+k'+\Delta$$

In the first embodiment, different from the conventional 3GPP TS 38.211 standard, as a sparse mode 1 improved based on the DMRS mode 1, the value of k is as follows:

$$k=6n+3k'+\Delta$$

A DMRS configuration parameter table corresponding to the sparse mode 1 is shown in the following table 1:

TABLE 1

|  | Column 1 | Column 2 CDM group | Column 3 $\Delta$ | Column 4 $w_f(k')$ k' = 0 | Column 5 $w_f(k')$ k' = 1 | Column 6 $w_t(l')$ l' = 0 | Column 7 $w_t(l')$ l' = 1 | Column 8 | Column 9 CDM group | Column 10 $\Delta$ | Column 11 $w_f(k')$ k' = 0 | Column 12 $w_f(k')$ k' = 1 | Column 13 $w_t(l')$ l' = 0 | Column 14 $w_t(l')$ l' = 1 |
|---|---|---|---|---|---|---|---|---|---|---|---|---|---|---|
|  | $\bar{p}$ |  |  |  |  |  |  | $\bar{p}$ |  |  |  |  |  |  |
| Row 1 | 0 | 0 | 0 | +1 | +1 | +1 | +1 | 6 | 0 | 0 | +1 | +1 | +1 | −1 |
| Row 2 | 1 | 0 | 0 | +1 | −1 | +1 | +1 | 7 | 0 | 0 | +1 | −1 | +1 | −1 |
| Row 3 | 2 | 1 | 1 | +1 | +1 | +1 | +1 | 8 | 1 | 1 | +1 | +1 | +1 | −1 |
| Row 4 | 3 | 1 | 1 | +1 | −1 | +1 | +1 | 9 | 1 | 1 | +1 | −1 | +1 | −1 |
| Row 5 | 4 | 2 | 2 | +1 | +1 | +1 | +1 | 10 | 2 | 2 | +1 | +1 | +1 | −1 |
| Row 6 | 5 | 2 | 2 | +1 | −1 | +1 | +1 | 11 | 2 | 2 | +1 | −1 | +1 | −1 |

Here, the data bounded by rows 1-4 and all columns represents the DMRS configuration parameter of existed port in the conventional 3GPP TS 38.211 standard, and the data bounded by rows 5-6 and columns 2 to 3 and 9 to 10 represents the DMRS configuration parameter of added port according to the first embodiment of this disclosure.

Figure 5A:
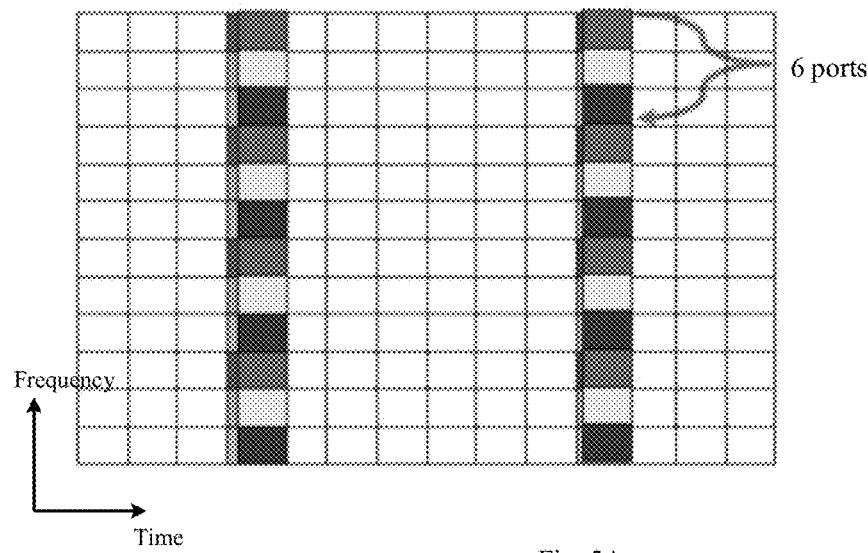
FIG. 5A and FIG. 5B show a first example (sparse mode 1) of a schematic view of DMRS resource allocation according to the first embodiment of this disclosure.
Figure 5A:
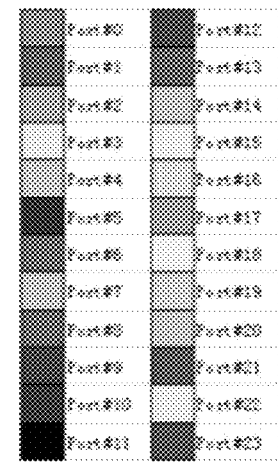
Figure 5B:
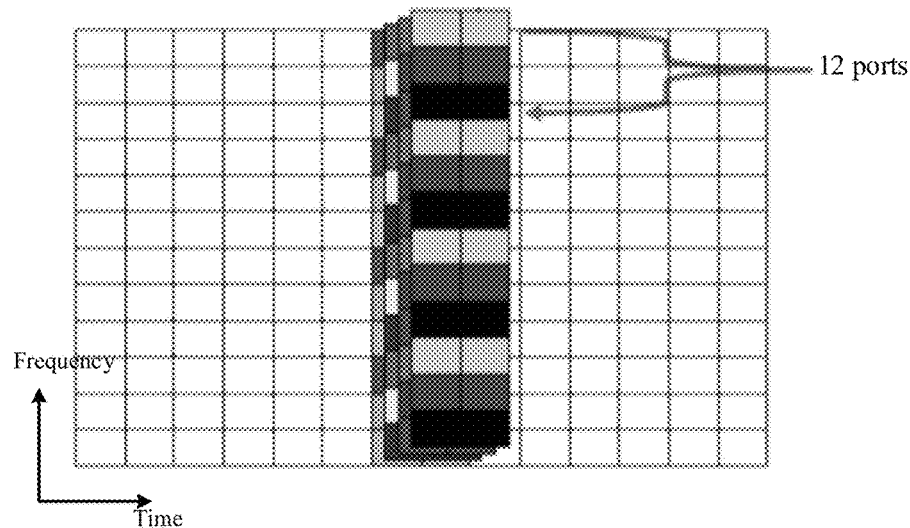
Figure 5B:
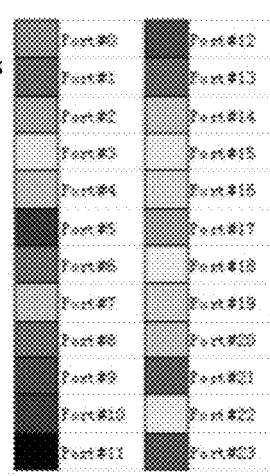

FIG. 5A and FIG. 5B illustrate a first example (sparse mode 1) of a schematic view of DMRS resource allocation according to the first embodiment of this disclosure. Similar to FIG. 2A and FIG. 2B, in FIG. 5A and FIG. 5B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 5A, a case of transmitting DMRS signal by using one OFDM symbol is illustrated. In FIG. 5A, at the same time domain resource location, DMRS signals corresponding to three ports are transmitted alternately by different REs (comb REs). In contrast, in FIG. 2A, at the same time domain resource location, DMRS signals corresponding to 2 ports are transmitted alternately by different REs (comb REs). Further, in FIG. 5A, two DMRS signals are shown overlapped at the same time domain resource location. These two DMRS signals are distinguished by orthogonal sequence. Therefore, in FIG. 5A, the DMRS signal of 6 user equipment can be supported to be transmitted at same time domain resource. As compared to FIG. 2A, the number of supportable user equipment is increased.

FIG. 5B illustrates a case of transmitting DMRS signals by using two OFDM symbols. In FIG. 5B, at the same time domain resource location, DMRS signals corresponding to three ports are transmitted alternately by different REs (comb REs). In contrast, in FIG. 2B, at the same time domain resource location, DMRS signals corresponding to two ports are transmitted alternately by different REs (comb REs). Further, in FIG. 5B, four DMRS signals are shown overlapped at the same time domain resource location. These four DMRS signals are distinguished by orthogonal sequence and time domain orthogonal cover code (TD-OCC). Therefore, in FIG. 5B, the DMRS signals of twelve user equipment can be supported to be transmitted at same time domain resource. As compared to FIG. 2B, the number of supportable user equipment is increased.

In the first embodiment, different from the conventional 3GPP TS 38.222 standard, as a sparse mode 2 improved based on the DMRS mode 1, the value of k is as follows:

$$k=8n+4k'+\Delta$$

A DMRS configuration parameter table corresponding to the sparse mode 2 is shown in the following table 2:

TABLE 2

|  | Column 1 | Column 2 CDM group | Column 3 $\Delta$ | Column 4 $w_f(k')$ k' = 0 | Column 5 $w_f(k')$ k' = 1 | Column 6 $w_t(l')$ l' = 0 | Column 7 $w_t(l')$ l' = 1 | Column 8 | Column 9 CDM group | Column 10 $\Delta$ | Column 11 $w_f(k')$ k' = 0 | Column 12 $w_f(k')$ k' = 1 | Column 13 $w_t(l')$ l' = 0 | Column 14 $w_t(l')$ l' = 1 |
|---|---|---|---|---|---|---|---|---|---|---|---|---|---|---|
|  | $\bar{p}$ |  |  |  |  |  |  | $\bar{p}$ |  |  |  |  |  |  |
| Row 1 | 0 | 0 | 0 | +1 | +1 | +1 | +1 | 8 | 0 | 0 | +1 | +1 | +1 | −1 |
| Row 2 | 1 | 0 | 0 | +1 | −1 | +1 | +1 | 9 | 0 | 0 | +1 | −1 | +1 | −1 |
| Row 3 | 2 | 1 | 1 | +1 | +1 | +1 | +1 | 10 | 1 | 1 | +1 | +1 | +1 | −1 |
| Row 4 | 3 | 1 | 1 | +1 | −1 | +1 | +1 | 11 | 1 | 1 | +1 | −1 | +1 | −1 |
| Row 5 | 4 | 2 | 2 | +1 | +1 | +1 | +1 | 12 | 2 | 2 | +1 | +1 | +1 | −1 |
| Row 6 | 5 | 2 | 2 | +1 | −1 | +1 | +1 | 13 | 2 | 2 | +1 | −1 | +1 | −1 |
| Row 7 | 6 | 3 | 3 | +1 | +1 | +1 | +1 | 14 | 3 | 3 | +1 | +1 | +1 | −1 |
| Row 8 | 7 | 3 | 3 | +1 | −1 | +1 | +1 | 15 | 3 | 3 | +1 | −1 | +1 | −1 |

Here, the data bounded by rows 1-4 and all columns represents the DMRS configuration parameter of existed port in the conventional 3GPP TS 38.211 standard, and the data bounded by rows 5-8 and the columns 2 to 3 and 9 to 10 represents the DMRS configuration parameter of added port according to the first embodiment of this disclosure.

Figure 6A:
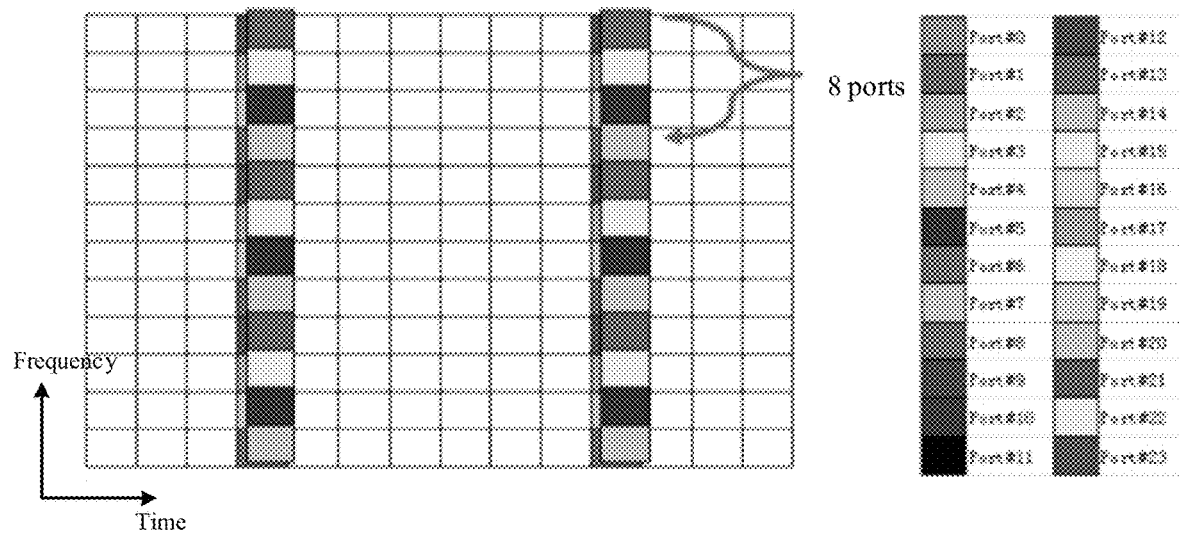
FIG. 6A and FIG. 6B show a second example (sparse mode 2) of a schematic view of DMRS resource allocation according to the first embodiment of this disclosure.
Figure 6B:
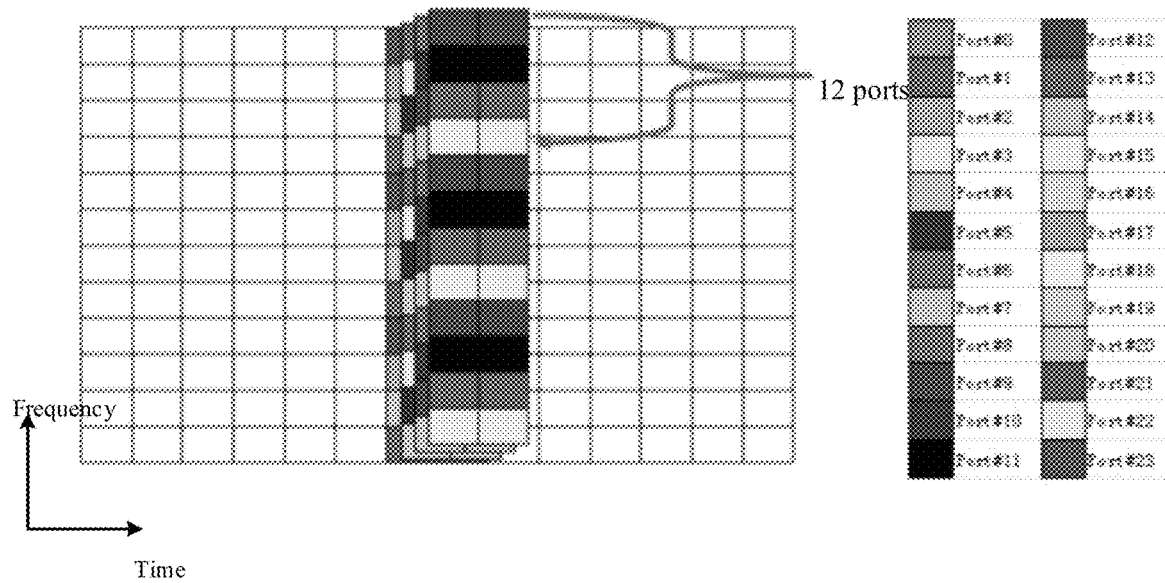

FIG. 6A and FIG. 6B illustrate a second example (sparse mode 2) of a schematic view of DMRS resource allocation according to the first embodiment of this disclosure. Similar to FIG. 2A and FIG. 2B, in FIG. 6A and FIG. 6B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 6A, a case of transmitting DMRS signal by using one OFDM symbol is illustrated. In FIG. 6A, at the same time domain resource location, DMRS signals corresponding to four ports are transmitted alternately by different REs (comb REs). In contrast, in FIG. 2A, at the same time domain resource location, DMRS signals corresponding to 2 ports are transmitted alternately by different REs (comb REs). Further, in FIG. 6A, two DMRS signals are shown overlapped at the same time domain resource location. These two DMRS signals are distinguished by orthogonal sequence. Therefore, in FIG. 6A, the DMRS signals of eight user equipment can be supported to be transmitted at same time domain resource. As compared to FIG. 2A, the number of supportable user equipment is increased.

FIG. 6B illustrates a case of transmitting DMRS signals by using two OFDM symbols. In FIG. 6B, at the same time domain resource location, DMRS signals corresponding to four ports are transmitted alternately by different REs (comb REs). In contrast, in FIG. 2B, at the same time domain resource location, DMRS signals corresponding to two ports are transmitted alternately by different REs (comb REs). Further, in FIG. 6B, four DMRS signals are shown overlapped at the same time domain resource location. These four DMRS signals are distinguished by orthogonal sequence and time domain orthogonal cover code (TD-OCC). Therefore, in FIG. 6B, the DMRS signals of sixteen user equipment can be supported to be transmitted at same time domain resource. As compared to FIG. 2B, the number of supportable user equipment is increased.

In the first embodiment, different from the conventional 3GPP TS 38.333 standard, as a sparse mode 3 improved based on the DMRS mode 1, the value of k is as follows:

$$k=12n+6k'+\Delta$$

A DMRS configuration parameter table corresponding to the sparse mode 3 is shown in the following table 3:

Here, the data bounded by rows 1-4 and all columns represents the DMRS configuration parameter of existed port in the conventional 3GPP TS 38.211 standard, and the data bounded by rows 5-12 and columns 2 to 3 and 9 to 10 represents the DMRS configuration parameter of added port according to the first embodiment of this disclosure.

Figure 7A:
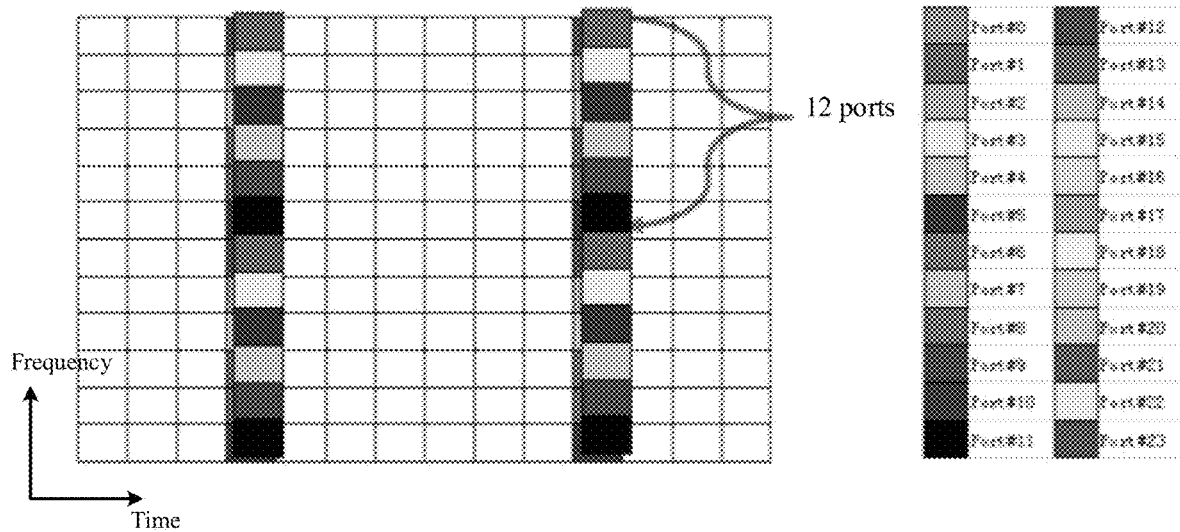
FIG. 7A and FIG. 7B show a third example (sparse mode 3) of a schematic view of DMRS resource allocation according to the first embodiment of this disclosure.
Figure 7B:
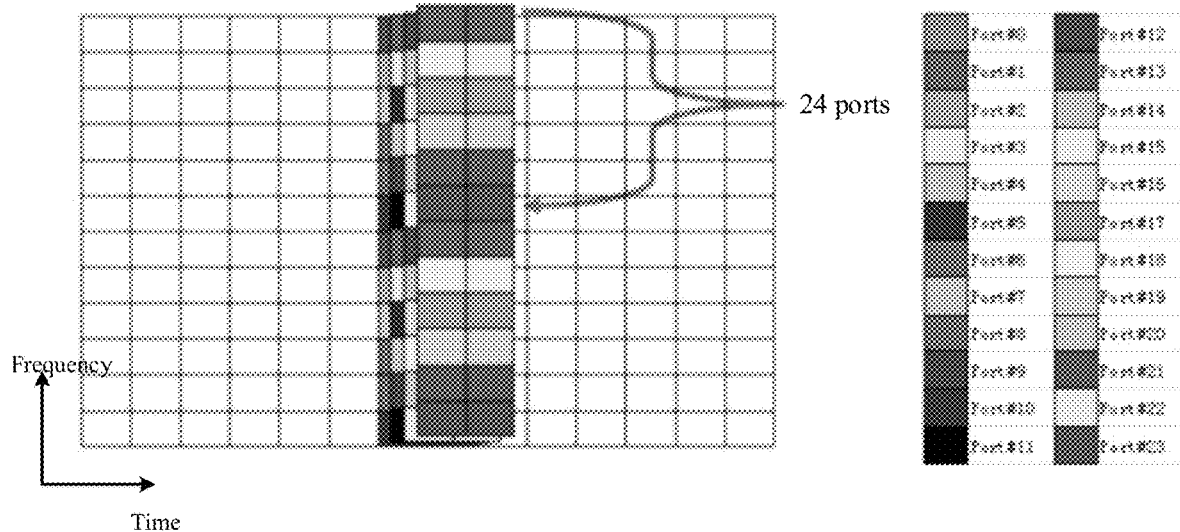

FIG. 7A and FIG. 7B illustrate a third example (sparse mode 3) of a schematic view of DMRS resource allocation according to the first embodiment of this disclosure. Similar to FIG. 2A and FIG. 2B, in FIG. 7A and FIG. 7B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 7A, a case of transmitting DMRS signals by using one OFDM symbol is illustrated. In FIG. 7A, at the same time domain resource location, DMRS signals corresponding to six ports are transmitted alternately by different REs (comb REs). In contrast, in FIG. 2A, at the same time domain resource location, DMRS signals corresponding to two ports are transmitted alternately by different REs (comb REs). Further, in FIG. 7A, two DMRS signals are shown overlapped at the same time domain resource location. These two DMRS signals are distinguished by orthogonal sequence. Therefore, in FIG. 7A, the DMRS signals of twelve user equipment can be supported to be transmitted at same time domain resource. As compared to FIG. 2A, the number of supportable user equipment is increased.

FIG. 7B illustrates a case of transmitting DMRS signals by using two OFDM symbols. In FIG. 7B, at the same time domain resource location, DMRS signals corresponding to six ports are transmitted alternately by different REs (comb REs). In contrast, in FIG. 2B, at the same time domain resource location, DMRS signals corresponding to two ports are transmitted alternately by different REs (comb REs). Further, in FIG. 78, four DMRS signals are shown overlapped at the same time domain resource location. These four DMRS signals are distinguished by orthogonal sequence and time domain orthogonal cover code (TD-OCC). Therefore, in FIG. 7B, the DMRS signals of twenty-four user equipment can be supported to be transmitted at same time domain resource. As compared to FIG. 7B, the number of supportable user equipment is increased.

In the first embodiment, different from the conventional 4GPP TS 48.444 standard, as a sparse mode 4 improved based on the DMRS mode 2, the value of k is as follows:

$$k=12n+k'+\Delta$$

TABLE 3

| | Column 1 | Column 2 CDM | Column 3 | Column 4 $w_f(k')$ | Column 5 | Column 6 $w_t(l')$ | Column 7 | Column 8 | Column 9 CDM | Column 10 | Column 11 $w_f(k')$ | Column 12 | Column 13 $w_t(l')$ | Column 14 |
|---|---|---|---|---|---|---|---|---|---|---|---|---|---|---|
| | $\bar{p}$ | group | $\Delta$ | k' = 0 | k' = 1 | l' = 0 | l' = 1 | $\bar{p}$ | group | $\Delta$ | k' = 0 | k' = 1 | l' = 0 | l' = 1 |
| Row 1 | 0 | 0 | 0 | +1 | +1 | +1 | +1 | 12 | 0 | 0 | +1 | +1 | +1 | −1 |
| Row 2 | 1 | 0 | 0 | +1 | −1 | +1 | +1 | 13 | 0 | 0 | +1 | −1 | +1 | −1 |
| Row 3 | 2 | 1 | 1 | +1 | +1 | +1 | +1 | 14 | 1 | 1 | +1 | +1 | +1 | −1 |
| Row 4 | 3 | 1 | 1 | +1 | −1 | +1 | +1 | 15 | 1 | 1 | +1 | −1 | +1 | −1 |
| Row 5 | 4 | 2 | 2 | +1 | +1 | +1 | +1 | 16 | 2 | 2 | +1 | +1 | +1 | −1 |
| Row 6 | 5 | 2 | 2 | +1 | −1 | +1 | +1 | 17 | 2 | 2 | +1 | −1 | +1 | −1 |
| Row 7 | 6 | 3 | 3 | +1 | +1 | +1 | +1 | 18 | 3 | 3 | +1 | +1 | +1 | −1 |
| Row 8 | 7 | 3 | 3 | +1 | −1 | +1 | +1 | 19 | 3 | 3 | +1 | −1 | +1 | −1 |
| Row 9 | 8 | 4 | 4 | +1 | +1 | +1 | +1 | 20 | 4 | 4 | +1 | +1 | +1 | −1 |
| Row 10 | 9 | 4 | 4 | +1 | −1 | +1 | +1 | 21 | 4 | 4 | +1 | −1 | +1 | −1 |
| Row 11 | 10 | 5 | 5 | +1 | +1 | +1 | +1 | 22 | 5 | 5 | +1 | +1 | +1 | −1 |
| Row 12 | 11 | 5 | 5 | +1 | −1 | +1 | +1 | 23 | 5 | 5 | +1 | −1 | +1 | −1 |

A DMRS configuration parameter table corresponding to the sparse mode 4 is shown in the following table 4:

TABLE 4

| Column 1 $\bar{p}$ | Column 2 CDM group | Column 3 Δ | Column 4 $w_f(k')$ k' = 0 | Column 5 k' = 1 | Column 6 $w_t(l')$ l' = 0 | Column 7 l' = 1 | Column 8 $\bar{p}$ | Column 9 CDM group | Column 10 Δ | Column 11 $w_f(k')$ k' = 0 | Column 12 k' = 1 | Column 13 $w_t(l')$ l' = 0 | Column 14 l' = 1 |
|---|---|---|---|---|---|---|---|---|---|---|---|---|---|
| Row 1 | 0 | 0 | 0 | +1 | +1 | +1 | +1 | 12 | 0 | 0 | +1 | +1 | +1 | −1 |
| Row 2 | 1 | 0 | 0 | +1 | −1 | +1 | +1 | 13 | 0 | 0 | +1 | −1 | +1 | −1 |
| Row 3 | 2 | 1 | 2 | +1 | +1 | +1 | +1 | 14 | 1 | 2 | +1 | +1 | +1 | −1 |
| Row 4 | 3 | 1 | 2 | +1 | −1 | +1 | +1 | 15 | 1 | 2 | +1 | −1 | +1 | −1 |
| Row 5 | 4 | 2 | 4 | +1 | +1 | +1 | +1 | 16 | 2 | 4 | +1 | +1 | +1 | −1 |
| Row 6 | 5 | 2 | 4 | +1 | −1 | +1 | +1 | 17 | 2 | 4 | +1 | −1 | +1 | −1 |
| Row 7 | 6 | 3 | 6 | +1 | +1 | +1 | +1 | 18 | 3 | 6 | +1 | +1 | +1 | −1 |
| Row 8 | 7 | 3 | 6 | +1 | −1 | +1 | +1 | 19 | 3 | 6 | +1 | −1 | +1 | −1 |
| Row 9 | 8 | 4 | 8 | +1 | +1 | +1 | +1 | 20 | 4 | 8 | +1 | +1 | +1 | −1 |
| Row 10 | 9 | 4 | 8 | +1 | −1 | +1 | +1 | 21 | 4 | 8 | +1 | −1 | +1 | −1 |
| Row 11 | 10 | 5 | 10 | +1 | +1 | +1 | +1 | 22 | 5 | 10 | +1 | +1 | +1 | −1 |
| Row 12 | 11 | 5 | 10 | +1 | −1 | +1 | +1 | 23 | 5 | 10 | +1 | −1 | +1 | −1 |

Here, the data bounded by rows 1-6 and all columns represents the DMRS configuration parameter of existed port in the conventional 3GPP TS 38.211 standard, and the data bounded by rows 7-12 and columns 2 to 3 and 9 to 10 represents the DMRS configuration parameter of added port according to the first embodiment of this disclosure.

Figure 8A:
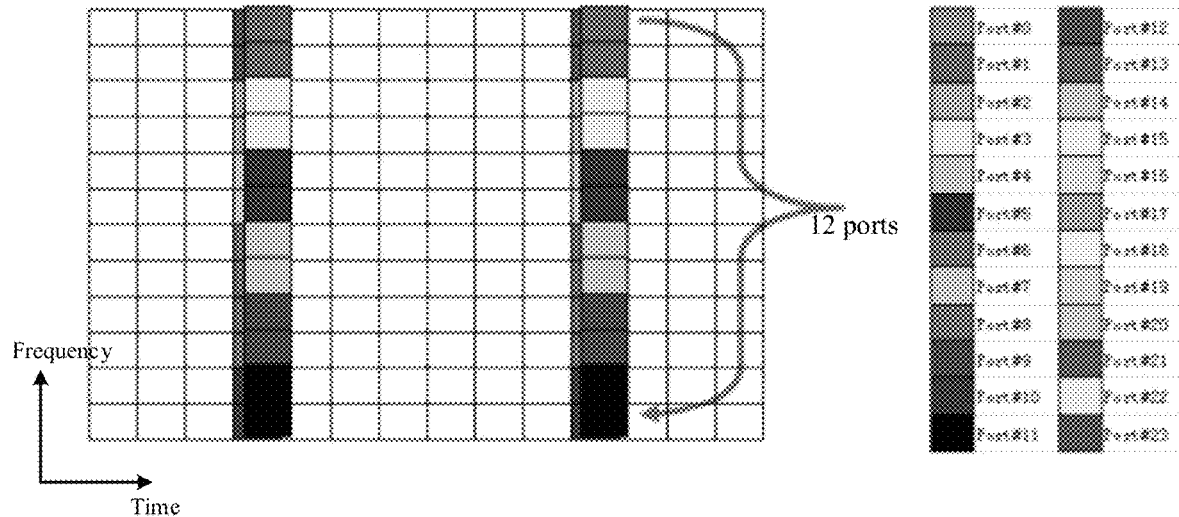
FIG. 8A and FIG. 8B show a fourth example (sparse mode 4) of a schematic view of DMRS resource allocation according to the first embodiment of this disclosure.
Figure 8B:
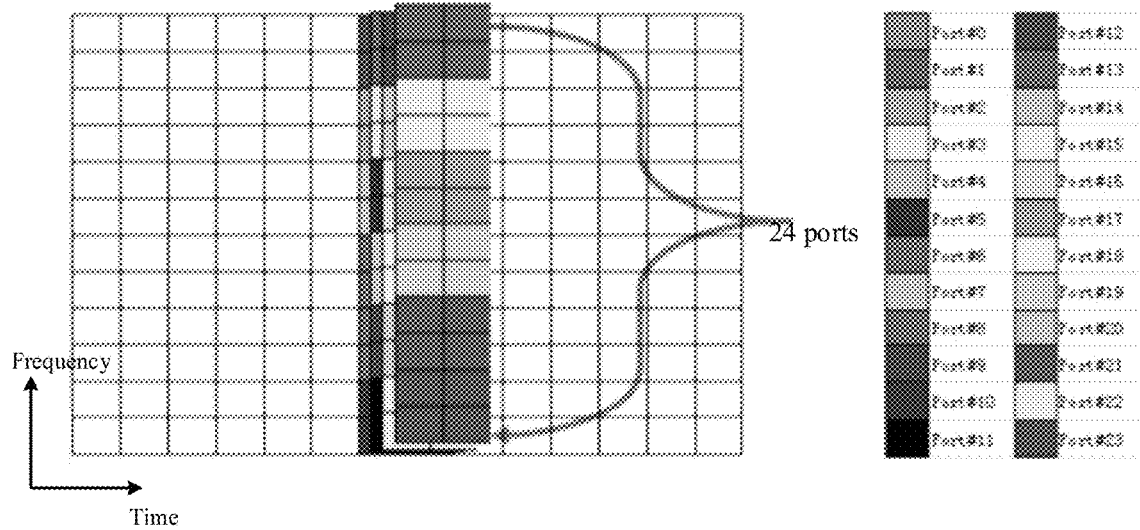

FIG. 8A and FIG. 8B illustrate a fourth example (sparse mode 4) of a schematic view of DMRS resource allocation according to the first embodiment of this disclosure. Similar to FIG. 3A and FIG. 3B, in FIG. 8A and FIG. 8B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 8A, a case of transmitting DMRS signals by using one OFDM symbol is illustrated. In FIG. 8A, at the same time domain resource location, DMRS signals corresponding to one port are transmitted by adjacent two REs (adjacent REs), and DMRS signals corresponding to six ports are transmitted alternately every two REs. In contrast, in FIG. 3A, at the same time domain resource location, DMRS signals corresponding to one port are transmitted by adjacent two REs (adjacent REs), and DMRS signals corresponding to three ports are transmitted alternately every two REs. Further, in FIG. 8A, two DMRS signals are shown overlapped at the same time domain resource location. These two DMRS signals are distinguished by orthogonal sequence. For example, a manner for generating orthogonal sequence may be a manner of adding frequency domain orthogonal cover code (FD-OCC). Therefore, in FIG. 8A, the DMRS signals of twelve user equipment can be supported to be transmitted at same time domain resource. As compared to FIG. 3A, the number of supportable user equipment is increased.

FIG. 8B illustrates a case of transmitting DMRS signals by using two OFDM symbols. In FIG. 8B, at the same time domain resource location, DMRS signals corresponding to one port are transmitted by adjacent two REs (adjacent REs), and DMRS signals corresponding to six ports are transmitted alternately every two REs. In contrast, in FIG. 3A, at the same time domain resource location, DMRS signals corresponding to one port are transmitted by adjacent two REs (adjacent REs), and DMRS signals corresponding to three ports are transmitted alternately every two REs. Further, in FIG. 8B, four DMRS signals are shown overlapped at the same time domain resource location. These four DMRS signals are distinguished by orthogonal sequence and time domain orthogonal cover code (TD-OCC). Therefore, in FIG. 8B, the DMRS signals of twenty-four user equipment can be supported to be transmitted at same time domain resource. As compared to FIG. 3B, the number of supportable user equipment is increased.

Several DMRS sparse modes according to the first embodiment in the case that Transform pre-coding is disabled are described hereinbefore. Since the PN sequence supports the DMRS mode 1 and the DMRS mode 2, the sparse mode 1 to the sparse mode 4 can be applied. On the other hand, in case that transform pre-coding is enabled, since the ZC sequence only supports the DMRS mode 1 but does not support the DMRS mode 2, only the sparse mode 1 to the sparse mode 3 can be applied.

It can be seen that by the first embodiment, in the transmission of the DMRS signals, the maximum number of supportable user equipment would be twenty-four.

Then, at step S202, information indicating the allocating mode and information indicating the parameter is transmitted to the plurality of user equipment.

The Second Embodiment

Figure 9:
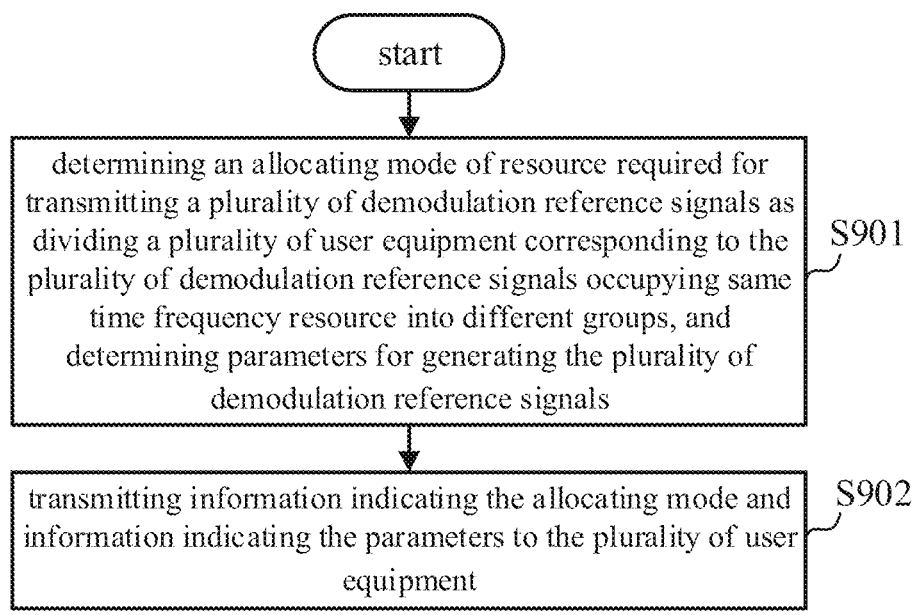
FIG. 9 is a flow chart illustrating a procedure of a resource allocating method for demodulation reference signal executed by a base station according to a second embodiment of this disclosure.

FIG. 9 illustrates a resource allocating method for demodulation reference signal executed by a base station according to the second embodiment of this disclosure. As shown in FIG. 9, the method includes the following steps.

First, at step S901, an allocating mode of resource required for transmitting a plurality of demodulation reference signal is determined as dividing a plurality of user equipment corresponding to a plurality of demodulation reference signal occupying same time frequency resource into different groups, here, the demodulation reference signals corresponding to respective user equipment in a same group are orthogonal, and the demodulation reference signals corresponding to respective user equipment in different groups are non-orthogonal, and parameters for generating the plurality of demodulation reference signals are determined, here, the plurality of demodulation reference signals are corresponding to the plurality of user equipment, and the allocating mode is able to support transmitting the plurality of demodulation reference signals on same time domain resource, and the parameters are able to make the demodulation reference signals transmitted on same time frequency resource to be distinguished from each other.

In the determined allocating mode, the different groups are allocated same time domain resource. And, in one same group, different user equipment are allocated different frequency domain resource to transmit the demodulation reference signal.

That is, in the second embodiment, users occupying same time frequency resource can be divided into a plurality of groups, and orthogonal DMRS signals are transmitted in the same group, and non-orthogonal DMRS signals are transmitted between different groups, that is, more non-orthogonal user equipment groups are added on same time frequency resource. For example, in the prior arts, DMRS signals of one group of user equipment are transmitted on same time frequency resource, and in the second embodiment, DMRS signals of a plurality groups of user equipment can be transmitted on same time frequency resource. Therefore, the second embodiment can be regarded as an embodiment for increasing number of user equipment supported in code domain.

In the second embodiment, a case of adding non-orthogonal user equipment group based on the above-described DMRS mode 1 and DMRS mode 2 will be described as example. Hereinafter, two kinds of cases of adding the non-orthogonal user equipment group are described in an order of formula derivation, DMRS configuration parameter table and schematic view of DMRS resource allocation.

First, DMRS signal is generated by the following manner. In case that transform pre-coding is disabled, a pseudo-random sequence (PN sequence) is as DMRS signal r(n). A specific formula is as follows:

$$r(n) = \frac{1}{\sqrt{2}}(1 - 2 \cdot c(2n)) + j\frac{1}{\sqrt{2}}(1 - 2 \cdot c(2n+1))$$

Here, the pseudo-random sequence c(i) is initialized by the following formula.

$$c_{init} = \left(2^{17}\left(N_{symb}^{slot}n_{s,f}^{\mu} + l + 1\right)\left(2N_{ID}^{nSCID} + 1\right) + 2N_{ID}^{nSCID} + n_{SCID}\right)\mod 2^{31}$$

In case that transform pre-coding is enabled, a ZC sequence is as DMRS signal r(n). A specific formula is as follows:

$$r(n) = r_{u,v}^{(\alpha,\delta)}(n)$$
$$n = 0, 1, \ldots, M_{sc}^{PUSCH} - 1$$

The above formula and meaning of symbols are same as in 3GPP TS 38.211 standard.

In the second embodiment, the parameters determined at step S801 include not only $N_{ID}^{nSCID}$ (PN sequence) or $N_{ID}^{RS}$ (ZC sequence) for generating the DMRS signal, but also parameters for distinguishing between ports corresponding to the demodulation reference signals transmitted on the same time frequency resource (for example, distinguishing between several columns overlapped at the same time domain resource location), for example, FD-OCC. And, in the second embodiment, the $N_{ID}^{nSCID}$ (PN sequence) or the $N_{ID}^{RS}$ (ZC sequence) for generating the DMRS signal determined at step S801 are same for all user equipment in same group, and are different for user equipment of different groups. That is, in the second embodiment, base sequences of the DMRS signals corresponding to user equipment of same group are same, and base sequences of the DMRS signals corresponding to user equipment of different groups are different.

For the k-th sub-carrier and l-th RE (a direction of time axis), DMRS signal corresponding thereto is calculated according to the following formula:

$$\tilde{a}_{k,l}^{(\tilde{p}_j,\mu)} = \begin{cases} w_f(k')w_t(l')r_1(2n+k'), & j = 0, i, 2i, \ldots \\ w_f(k')w_t(l')r_2(2n+k'), & j = 1, i+1, 2i+1, \ldots \\ \ldots \\ w_f(k')w_t(l')r_i(2n+k'), & j = i-1, 2i-1, \ldots, v-1 \end{cases}$$

$$k' = 0, 1$$
$$l = \bar{l} + l'$$
$$n = 0, 1, \ldots$$

Here, $w_f(k')$ and $w_t(l')$ represent frequency domain OCC and time domain OCC respectively, $r_1, r_2, \ldots, r_i$ are the base sequences used by different user equipment groups, v represents total number of user equipment, and i represents number of group of user equipment.

In the second embodiment, it does not extend in frequency domain, thus, the value of k is same as in the 3GPP TS 38.211 standard, that is, in the DMRS mode 1, it is k=4n+2k'+Δ; and in the DMRS mode 2, it is k=6n+k'+Δ.

DMRS configuration parameter table corresponding to adding a group of non-orthogonal user equipment groups (two groups in total) based on the DMRS mode 1 is shown as the following table 5:

TABLE 5

|  | Column 1 | Column 2 CDM | Column 3 | Column 4 $w_f(k')$ | Column 5 | Column 6 $w_t(l')$ | Column 7 | Column 8 | Column 9 CDM | Column 10 | Column 11 $w_f(k')$ | Column 12 | Column 13 $w_t(l')$ | Column 14 |
|---|---|---|---|---|---|---|---|---|---|---|---|---|---|---|
|  | $\bar{p}$ | group | Δ | k'=0 | k'=1 | l'=0 | l'=1 | $\bar{p}$ | group | Δ | k'=0 | k'=1 | l'=0 | l'=1 |
| Row 1 | 0 | 0 | 0 | +1 | +1 | +1 | +1 | 8 | 0 | 0 | +1 | +1 | +1 | −1 |
| Row 2 | 1 | 0 | 0 | +1 | +1 | +1 | +1 | 9 | 0 | 0 | +1 | +1 | +1 | −1 |
| Row 3 | 2 | 1 | 1 | +1 | +1 | +1 | +1 | 10 | 1 | 1 | +1 | +1 | +1 | −1 |
| Row 4 | 3 | 1 | 1 | +1 | +1 | +1 | +1 | 11 | 1 | 1 | +1 | +1 | +1 | −1 |
| Row 5 | 4 | 0 | 0 | +1 | −1 | +1 | +1 | 12 | 0 | 0 | +1 | −1 | +1 | −1 |
| Row 6 | 5 | 0 | 0 | +1 | −1 | +1 | +1 | 13 | 0 | 0 | +1 | −1 | +1 | −1 |
| Row 7 | 6 | 1 | 1 | +1 | −1 | +1 | +1 | 14 | 1 | 1 | +1 | −1 | +1 | −1 |
| Row 8 | 7 | 1 | 1 | +1 | −1 | +1 | +1 | 15 | 1 | 1 | +1 | −1 | +1 | −1 |

Here, the data bounded by rows 2, 4, 6 and 8 and all columns represents DMRS configuration parameter of a group of non-orthogonal user equipment group added according to the second embodiment of this disclosure.

Figure 10A:
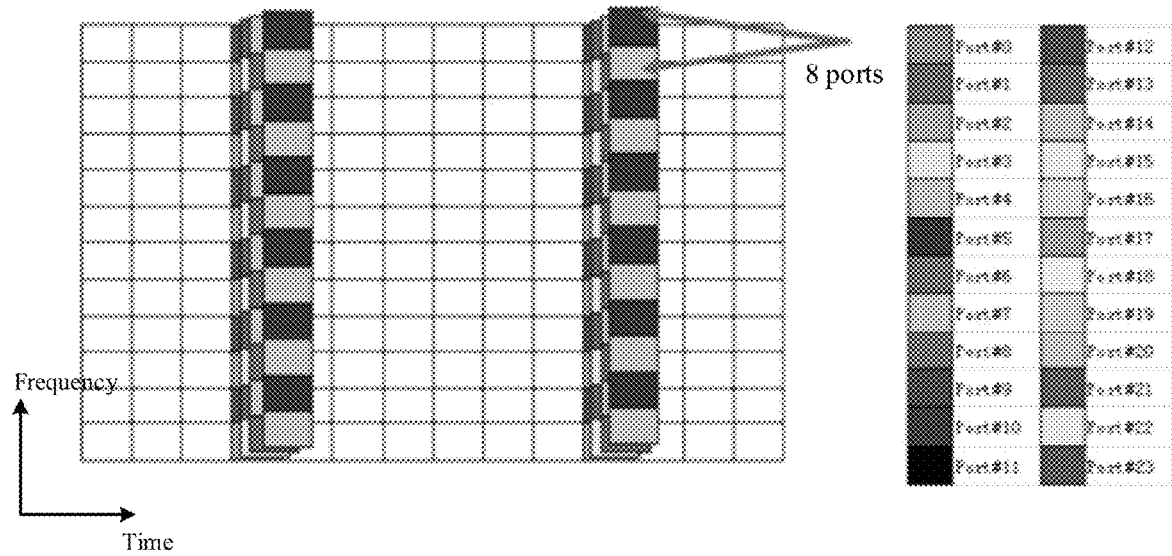
FIG. 10A and FIG. 10B show a first example (DMRS mode 1+non-orthogonal user equipment group) of a schematic view of DMRS resource allocation according to the second embodiment of this disclosure.
Figure 10B:
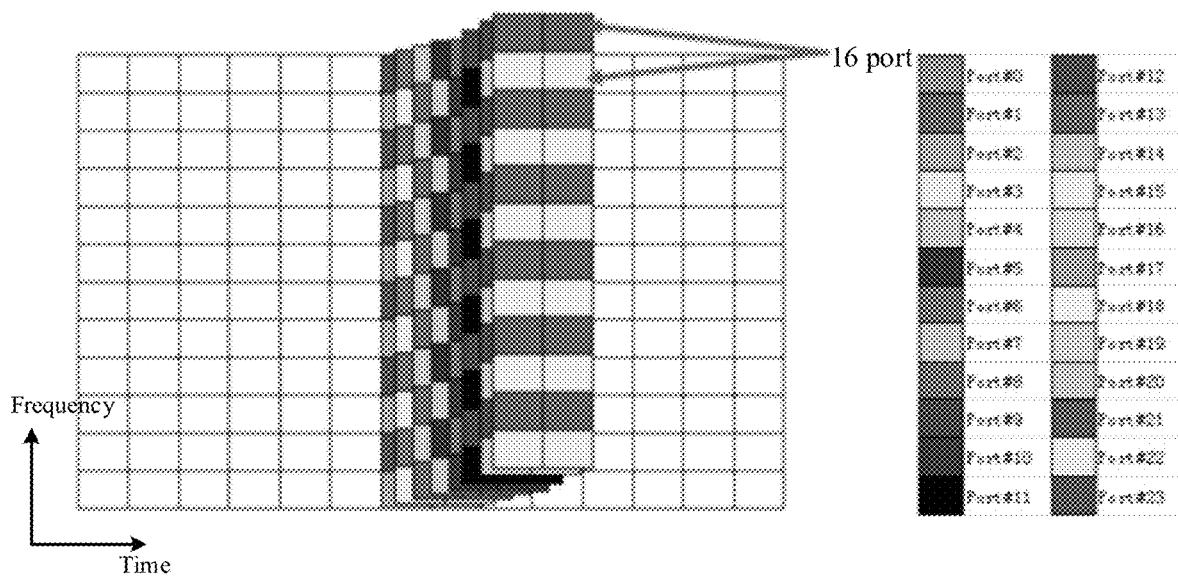

FIG. 10A and FIG. 10B show a first example (DMRS mode 1+non-orthogonal user equipment group) of a schematic view of DMRS resource allocation according to the second embodiment of this disclosure. Similar to FIG. 2A and FIG. 2B, in FIG. 10A and FIG. 10B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 10A, a case of transmitting DMRS signals by using one OFDM symbol is illustrated. In FIG. 10A, at the same time domain resource location, DMRS signals corresponding to two ports are transmitted alternately by different REs (comb REs). This is same as in FIG. 2A. Further, in FIG. 10A, four DMRS signals are shown overlapped at the same time domain resource location. Two of these four DMRS signals belong to a group, and DMRS signals in same group are distinguished by orthogonal sequence, and DMRS signals in different groups are distinguished by non-orthogonal sequence. In contrast, in FIG. 2A, two DMRS signals are shown overlapped at the same time domain resource location, these two DMRS signals belong to same group, and are distinguished by the orthogonal sequence. Therefore, in FIG. 10A, the DMRS signals of eight user equipment can be supported to be transmitted at same time domain resource. As compared to FIG. 2A, the number of supportable user equipment is increased.

FIG. 10B illustrates a case of transmitting DMRS signals by using two OFDM symbols. In FIG. 10B, at the same time domain resource location, DMRS signals corresponding to two ports are transmitted alternately by different REs (comb REs). This is same as in FIG. 2B. Further, in FIG. 10B, eight DMRS signals are shown overlapped at the same time domain resource location. Four of these eight DMRS signals belong to one group, and DMRS signals in same group are distinguished by orthogonal sequence, and DMRS signals in different groups are distinguished by non-orthogonal sequence. In contrast, in FIG. 2B, four DMRS signals are shown overlapped at the same time domain resource location, these four DMRS signals belong to one same group, and are distinguished by the orthogonal sequence. Therefore, in FIG. 10B, the DMRS signals of sixteen user equipment can be supported to be transmitted at same time domain resource. As compared to FIG. 2B, the number of supportable user equipment is increased.

DMRS configuration parameter table corresponding to adding a group of non-orthogonal user equipment groups (two groups in total) based on the DMRS mode 2 is shown as the following table 6:

TABLE 6

| Column 1 $\bar{p}$ | Column 2 CDM group | Column 3 $\Delta$ | Column 4 $w_f(k')$ $k'=0$ | Column 5 $w_f(k')$ $k'=1$ | Column 6 $w_t(l')$ $l'=0$ | Column 7 $w_t(l')$ $l'=1$ | Column 8 $\bar{p}$ | Column 9 CDM group | Column 10 $\Delta$ | Column 11 $w_f(k')$ $k'=0$ | Column 12 $w_f(k')$ $k'=1$ | Column 13 $w_t(l')$ $l'=0$ | Column 14 $w_t(l')$ $l'=1$ |
|---|---|---|---|---|---|---|---|---|---|---|---|---|---|
| Row 1 | 0 | 0 | 0 | +1 | +1 | +1 | +1 | 12 | 0 | 0 | +1 | +1 | +1 | −1 |
| Row 2 | 1 | 0 | 0 | +1 | +1 | +1 | +1 | 13 | 0 | 0 | +1 | +1 | +1 | −1 |
| Row 3 | 2 | 1 | 2 | +1 | +1 | +1 | +1 | 14 | 1 | 2 | +1 | +1 | +1 | −1 |
| Row 4 | 3 | 1 | 2 | +1 | +1 | +1 | +1 | 15 | 1 | 2 | +1 | +1 | +1 | −1 |
| Row 5 | 4 | 2 | 4 | +1 | +1 | +1 | +1 | 16 | 2 | 4 | +1 | +1 | +1 | −1 |
| Row 6 | 5 | 2 | 4 | +1 | +1 | +1 | +1 | 17 | 2 | 4 | +1 | +1 | +1 | −1 |
| Row 7 | 6 | 0 | 0 | +1 | −1 | +1 | +1 | 18 | 0 | 0 | +1 | −1 | +1 | −1 |
| Row 8 | 7 | 0 | 0 | +1 | −1 | +1 | +1 | 19 | 0 | 0 | +1 | −1 | +1 | −1 |
| Row 9 | 8 | 1 | 2 | +1 | −1 | +1 | +1 | 20 | 1 | 2 | +1 | −1 | +1 | −1 |
| Row 10 | 9 | 1 | 2 | +1 | −1 | +1 | +1 | 21 | 1 | 2 | +1 | −1 | +1 | −1 |
| Row 11 | 10 | 2 | 4 | +1 | −1 | +1 | +1 | 22 | 2 | 4 | +1 | −1 | +1 | −1 |
| Row 12 | 11 | 2 | 4 | +1 | −1 | +1 | +1 | 23 | 2 | 4 | +1 | −1 | +1 | −1 |

Here, the data bounded by rows 2, 4, 6, 8, 10 and 12 and all columns represent DMRS configuration parameters of a group of non-orthogonal user equipment group added according to the second embodiment of this disclosure.

Figure 11A:
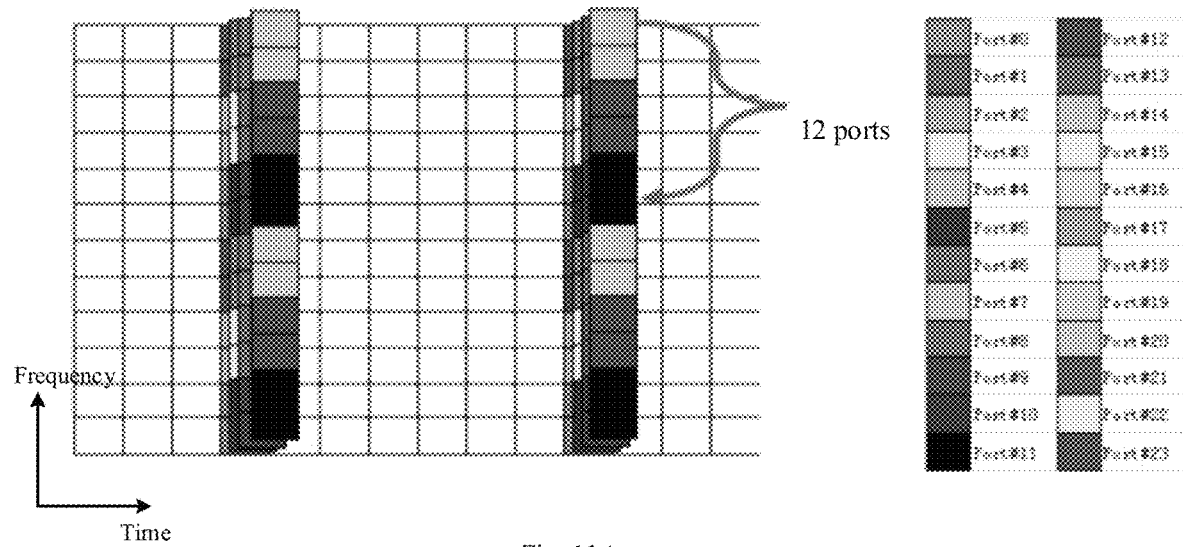
FIG. 11A and FIG. 11B show a second example (DMRS mode 2+non-orthogonal user equipment group) of a schematic view of DMRS resource allocation according to the second embodiment of this disclosure.
Figure 11B:
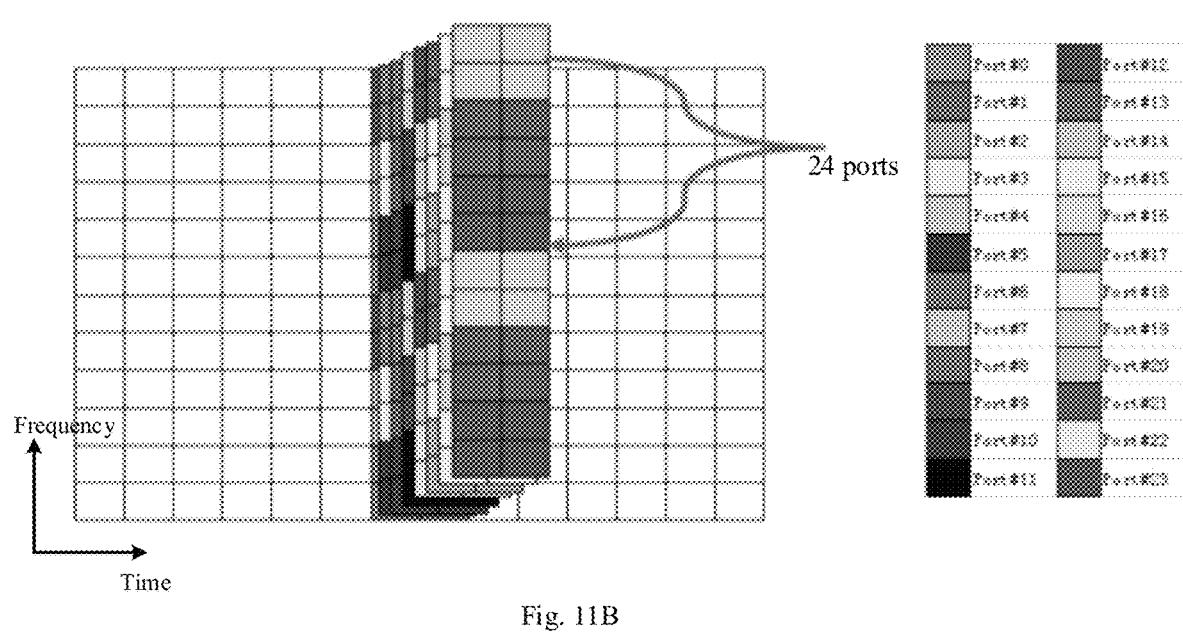

FIG. 11A and FIG. 11B illustrate a second example (DMRS mode 2+non-orthogonal user equipment group) of a schematic view of DMRS resource allocation according to the second embodiment of this disclosure. Similar to FIG. 3A and FIG. 3B, in FIG. 11A and FIG. 11B, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

In FIG. 11A, a case of transmitting DMRS signals by using one OFDM symbol is illustrated. In FIG. 11A, at the same time domain resource location, DMRS signals corresponding to one port are transmitted by adjacent two REs (adjacent REs), and DMRS signals corresponding to three ports are transmitted alternately every two REs. This is same as in FIG. 3A. Further, in FIG. 11A, four DMRS signals are shown overlapped at the same time domain resource location. Two of these four DMRS signals belong to a group, and DMRS signals in same group are distinguished by orthogonal sequence, and DMRS signals in different groups are distinguished by non-orthogonal sequence. In contrast, in FIG. 3A, two DMRS signals are shown overlapped at the same time domain resource location, these two DMRS signals belong to one same group, and are distinguished by the orthogonal sequence. Therefore, in FIG. 11A, the DMRS signals of 12 user equipment can be supported to be transmitted at same time domain resource. As compared to FIG. 3A, the number of supportable user equipment is increased.

FIG. 11B illustrates a case of transmitting DMRS signals by using two OFDM symbols. In FIG. 11B, at the same time domain resource location, DMRS signals corresponding to one port are transmitted by adjacent two REs (adjacent REs), and DMRS signals corresponding to three ports are transmitted alternately every two REs. This is same as in FIG. 3B. Further, in FIG. 11B, eight DMRS signals are shown overlapped at the same time domain resource location. Four of these eight DMRS signals belong to a group, and DMRS signals in same group are distinguished by orthogonal sequence, and DMRS signals in different groups are distinguished by non-orthogonal sequence. In contrast, in FIG. 3B, four DMRS signals are shown overlapped at the same time domain resource location, these four DMRS signals belong to same group, and are distinguished by the orthogonal sequence. Therefore, in FIG. 11B, the DMRS signals of 24 user equipment can be supported to be transmitted at same time domain resource. As compared to FIG. 3B, the number of supportable user equipment is increased.

Several DMRS sparse modes according to the second embodiment in the case that Transform pre-coding is disabled are described hereinbefore. Since the PN sequence supports the DMRS mode 1 and the DMRS mode 2, non-orthogonal user equipment group can be added based on the DMRS mode 1 or the DMRS mode 2. On the other hand, in case that transition pre-coding is enabled, since the ZC sequence only supports the DMRS mode 1 but does not support the DMRS mode 2, the non-orthogonal user equipment group can only be added based on the DMRS mode 1.

It can be seen that by the second embodiment, in the transmission of the DMRS signals, the maximum number of supportable user equipment would be twenty-four.

Then, at step S902, information indicating the allocating mode and information indicating the parameters are transmitted to the plurality of user equipment.

Third Embodiment

Figure 12:
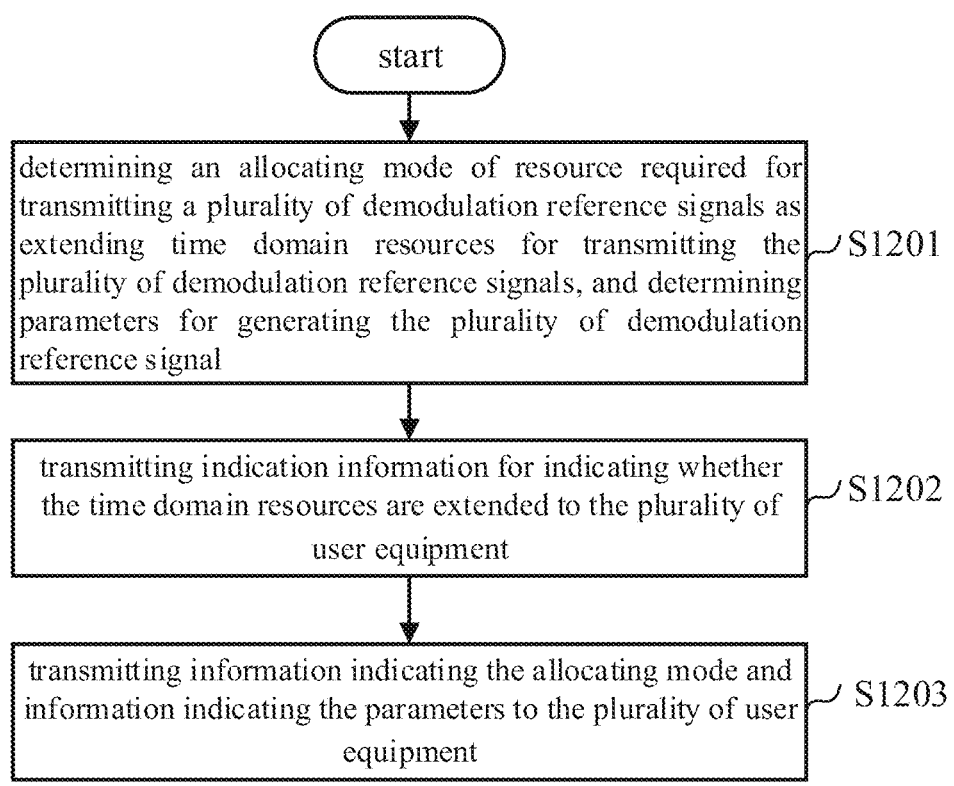
FIG. 12 is a flow chart illustrating a procedure of a resource allocating method for demodulation reference signal executed by a base station according to a third embodiment of this disclosure.

FIG. 12 illustrates a resource allocating method for demodulation reference signal executed by a base station according to the third embodiment of this disclosure. As show in FIG. 12, the method includes the following steps.

First, at step S1201, an allocating mode of resource required for transmitting a plurality of demodulation reference signal is determined as extending time domain resource for transmitting the plurality of demodulation reference signal and parameters for generating the plurality of demodulation reference signal are determined, here, the plurality of demodulation reference signals are corresponding to a plurality of user equipment respectively, and the allocating mode is able to support transmitting the plurality of demodulation reference signal on same time domain resource, and the parameters are able to make the demodulation reference signal transmitted by the same time frequency resource to be distinguished from each other.

Then, at step S1202, indication information for indicating whether the time domain resource is extended is transmitted to the plurality of user equipment. Also, information indicating the extended time domain resource locations can be further transmitted to the plurality of user equipment.

For example, the extended time domain resource locations can be new specified time domain resource locations. Alternatively, the extended time domain resource locations may also be multiplexed time domain resource locations of demodulation reference signal transmitted currently. In particular, as described above, generally, DMRS signal having position that is same as that of front loaded DMRS symbol is transmitted at positions of additional DMRS symbol to improve accuracy of data. In case of multiplexing, DMRS signals of different user equipment can be transmitted at positions of additional DMRS symbol, so as to be equivalent to extending the time domain resource for transmitting the DMRS signal.

That is, in the third embodiment, resource locations for transmitting DMRS can be increased on the time domain. For example, in the prior arts, DMRS signals of a plurality of user equipment are transmitted by using two OFDM symbols, and in the third embodiment, the DMRS signals of a plurality of user equipment can be transmitted by using more OFDM symbols (for example, 4 OFDM symbols). Therefore, the third embodiment can be regarded as an embodiment for extending number of user equipment supported in the time domain.

In the third embodiment, a case of extending the time domain resource for transmitting the DMRS signal based on the above-described DMRS mode 1 and DMRS mode 2 will be described as example. Hereinafter, the several cases are described in an order of formula derivation, DMRS configuration parameter table and schematic view of DMRS resource allocation.

First, DMRS signal is generated by the following manner. In case that transform pre-coding is disabled, a pseudo-random sequence (PN sequence) is as DMRS signal r(n). A specific formula is as follows:

$$r(n) = \frac{1}{\sqrt{2}}(1 - 2 \cdot c(2n)) + j\frac{1}{\sqrt{2}}(1 - 2 \cdot c(2n + 1))$$

Here, the pseudo-random sequence c(i) is initialized by the following formula.

$$c_{init} = \left(2^{17}\left(N_{symb}^{slot}n_{s,f}^{\mu} + l + 1\right)\left(2N_{ID}^{n_{SCID}} + 1\right) + 2N_{ID}^{n_{SCID}} + n_{SCID}\right) \bmod 2^{31}$$

In the third embodiment, since number of DMRS symbols is increased, the number of l is increased, and thus, times needed to calculate $c_{init}$ is increased.

In case that transform pre-coding is enabled, a ZC sequence is used as DMRS signal r(n). A specific formula is as follows:

$$r(n) = r_{u,v}^{(\alpha,\delta)}(n)$$

$$n = 0, 1, \ldots, M_{sc}^{PUSCH} - 1$$

In the third embodiment, the parameters determined at step S1101 include not only $N_{ID}^{n_{SCID}}$ (PN sequence) or $N_{ID}^{RS}$ (ZC sequence) for generating the DMRS signal, but also parameters for distinguishing between ports corresponding to the demodulation reference signals transmitted on the same time frequency resource (for example, distinguishing between several columns overlapped as shown in FIG. 2A to FIG. 3B), for example, FD-OCC. And, in the third embodiment, the $N_{ID}^{n_{SCID}}$ (PN sequence) or the $N_{ID}^{RS}$ (ZC sequence) for generating the DMRS signal determined at step S1101 are same for all user equipment.

For the k-th sub-carrier and l-th RE (a direction of time axis), DMRS signal corresponding thereto is calculated according to the following formula:

$$\tilde{a}_{k,i}^{(\tilde{p}_j,\mu)} = w_f(k')w_t(l')r(2n+k')$$

$$k' = 0, 1$$

$$l = \bar{l} + l'$$

$$n = 0, 1, \ldots$$

$$j = 0, 1, \ldots, v-1$$

Here, $w_f(k')$ and $w_t(l')$ represent frequency domain OCC and time domain OCC respectively.

The above formula and meaning of symbols are same as in 3GPP TS 38.211 standard.

In the third embodiment, it does not extend in frequency domain, thus, the value of k is same as in the 3GPP TS 38.211 standard, that is, in the DMRS mode 1, k=4n+2k'+Δ; and in the DMRS mode 2, k=6n+k'+Δ.

DMRS configuration parameter table adding overhead (the first example) based on the DMRS mode 1 is shown in the following table 7:

TABLE 7

| | Column 1 $\bar{p}$ | Column 2 CDM group | Column 3 Δ | Column 4 $w_f(k')$ k'=0 | Column 5 $w_f(k')$ k'=1 | Column 6 $w_t(l')$ l'=0 | Column 7 $w_t(l')$ l'=1 | Column 8 $w_t(l')$ l'=2 | Column 9 $w_t(l')$ l'=3 | Column 10 $\bar{p}$ | Column 11 CDM group | Column 12 Δ | Column 13 $w_f(k')$ k'=0 | Column 14 $w_f(k')$ k'=1 | Column 15 $w_t(l')$ l'=0 | Column 16 $w_t(l')$ l'=1 | Column 17 $w_t(l')$ l'=2 | Column 18 $w_t(l')$ l'=3 |
|---|---|---|---|---|---|---|---|---|---|---|---|---|---|---|---|---|---|---|
| Row 1 | 0 | 0 | 0 | +1 | +1 | +1 | +1 | +1 | +1 | 8 | 0 | 0 | +1 | +1 | +1 | +1 | −1 | −1 |
| Row 2 | 1 | 0 | 0 | +1 | −1 | +1 | +1 | +1 | +1 | 9 | 0 | 0 | +1 | −1 | +1 | +1 | −1 | −1 |
| Row 3 | 2 | 1 | 1 | +1 | +1 | +1 | +1 | +1 | +1 | 10 | 1 | 1 | +1 | +1 | +1 | +1 | −1 | −1 |
| Row 4 | 3 | 1 | 1 | +1 | −1 | +1 | +1 | +1 | +1 | 11 | 1 | 1 | +1 | −1 | +1 | +1 | −1 | −1 |
| Row 5 | 4 | 0 | 0 | +1 | +1 | +1 | −1 | +1 | −1 | 12 | 0 | 0 | +1 | +1 | +1 | −1 | −1 | +1 |
| Row 6 | 5 | 0 | 0 | +1 | −1 | +1 | −1 | +1 | −1 | 13 | 0 | 0 | +1 | −1 | +1 | −1 | −1 | +1 |
| Row 7 | 6 | 1 | 1 | +1 | +1 | +1 | −1 | +1 | −1 | 14 | 1 | 1 | +1 | +1 | +1 | −1 | −1 | +1 |
| Row 8 | 7 | 1 | 1 | +1 | −1 | +1 | −1 | +1 | −1 | 15 | 1 | 1 | +1 | −1 | +1 | −1 | −1 | +1 |

The data bounded by rows 1-8 and columns 6 to 9 and 15 to 18 represent DMRS configuration parameter adding overhead according to the third embodiment of this disclosure, and here, positions of 4 OFDM symbols are continuous.

Figure 13:
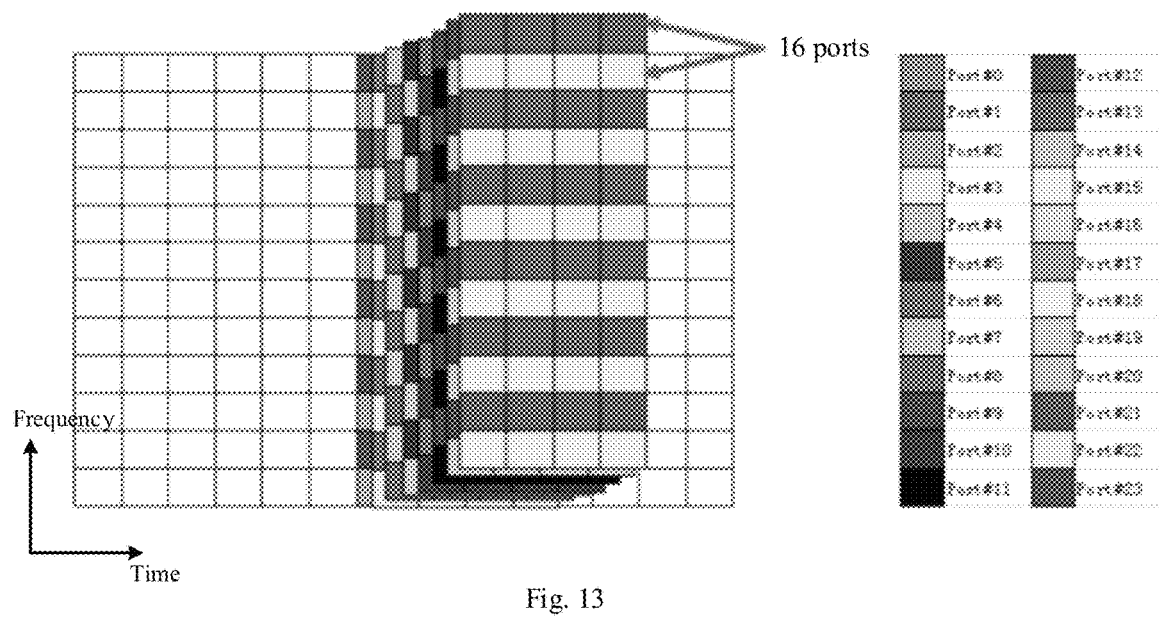
FIG. 13 shows a first example (DMRS mode 1+add overhead 1) of a schematic view of DMRS resource allocation according to the third embodiment of this disclosure.

FIG. 13 illustrates a first example (DMRS mode 1+add overhead 1) of a schematic view of DMRS resource allocation according to the third embodiment of this disclosure. Similar to FIG. 2A and FIG. 2B, in FIG. 13, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

FIG. 13 illustrates a case of transmitting DMRS signals by using four OFDM symbols. In FIG. 13, at the same time domain resource location, DMRS signals corresponding to two ports are transmitted alternately by different REs (comb REs). This is same as in the FIG. 2A and the FIG. 2B. Further, in FIG. 13, the DMRS signals are transmitted by four continuous OFDM symbols, thus, eight DMRS signals are shown overlapped at the same time domain resource location. These eight DMRS signal are distinguished by orthogonal sequence, that is, cyclic shift and time domain OCC. In contrast, in FIG. 2B, four DMRS signal are shown overlapped at the same time domain resource location. Therefore, in FIG. 13, the DMRS signals of sixteen user equipment can be supported to be transmitted at same time domain resource. As compared to FIG. 2B, the number of supportable user equipment is increased.

DMRS configuration parameter table adding overhead (the second example) based on the DMRS mode 1 is shown in the following table 8:

TABLE 8

| Column 1 $\bar{p}$ | Column 2 CDM group | Column 3 $\Delta$ | Column 4 $w_f(k')$ k' = 0 | Column 5 k' = 1 | Column 6 $w_t(l')$ $\bar{l} = l_1$ l' = 0 | Column 7 l' = 1 | Column 8 $\bar{l} = l_2$ l' = 0 | Column 9 l' = 1 | Column 10 $\bar{p}$ | Column 11 CDM group | Column 12 $\Delta$ | Column 13 $w_f(k')$ k' = 0 | Column 14 k' = 1 | Column 15 $w_t(l')$ $\bar{l} = l_1$ l' = 0 | Column 16 l' = 1 | Column 17 $\bar{l} = l_2$ l' = 0 | Column 18 l' = 1 |
|---|---|---|---|---|---|---|---|---|---|---|---|---|---|---|---|---|---|
| Row 1 | 0 | 0 | 0 | +1 | +1 | +1 | +1 | +1 | +1 | 8 | 0 | 0 | +1 | +1 | +1 | +1 | −1 | −1 |
| Row 2 | 1 | 0 | 0 | +1 | −1 | +1 | +1 | +1 | +1 | 9 | 0 | 0 | +1 | −1 | +1 | +1 | −1 | −1 |
| Row 3 | 2 | 1 | 1 | +1 | +1 | +1 | +1 | +1 | +1 | 10 | 1 | 1 | +1 | +1 | +1 | +1 | −1 | −1 |
| Row 4 | 3 | 1 | 1 | +1 | −1 | +1 | +1 | +1 | +1 | 11 | 1 | 1 | +1 | −1 | +1 | +1 | −1 | −1 |
| Row 5 | 4 | 0 | 0 | +1 | +1 | +1 | −1 | +1 | −1 | 12 | 0 | 0 | +1 | +1 | +1 | −1 | −1 | +1 |
| Row 6 | 5 | 0 | 0 | +1 | −1 | +1 | −1 | +1 | −1 | 13 | 0 | 0 | +1 | −1 | +1 | −1 | −1 | +1 |
| Row 7 | 6 | 1 | 1 | +1 | +1 | +1 | −1 | +1 | −1 | 14 | 1 | 1 | +1 | +1 | +1 | −1 | −1 | +1 |
| Row 8 | 7 | 1 | 1 | +1 | −1 | +1 | −1 | +1 | −1 | 15 | 1 | 1 | +1 | −1 | +1 | −1 | −1 | +1 |

The data bounded by rows 1-8 and columns 6 to 9 and 15 to 18 represent DMRS configuration parameter adding overhead according to the third embodiment of this disclosure, here, four OFDM symbols are divided into two groups, and positions of two OFDM symbols in each group are continuous.

user equipment can be supported to be transmitted at same time domain resource. As compared to FIG. 2B, the number of supportable user equipment is increased.

DMRS configuration parameter table adding overhead (the third example) based on the DMRS mode 1 is shown in the following table 9:

TABLE 9

| Column 1 $\bar{p}$ | Column 2 CDM group | Column 3 $\Delta$ | Column 4 $w_f(k')$ k' = 0 | Column 5 k' = 1 | Column 6 $w_t(l')$ $\bar{l} = l_1$ l' = 0 | Column 7 $\bar{l} = l_2$ l' = 0 | Column 8 $\bar{l} = l_3$ l' = 0 | Column 9 $\bar{l} = l_4$ l' = 0 | Column 10 $\bar{p}$ | Column 11 CDM group | Column 12 $\Delta$ | Column 13 $w_f(k')$ k' = 0 | Column 14 k' = 1 | Column 15 $w_t(l')$ $\bar{l} = l_1$ l' = 0 | Column 16 $\bar{l} = l_2$ l' = 0 | Column 17 $\bar{l} = l_3$ l' = 0 | Column 18 $\bar{l} = l_4$ l' = 0 |
|---|---|---|---|---|---|---|---|---|---|---|---|---|---|---|---|---|---|
| Row 1 | 0 | 0 | 0 | +1 | +1 | +1 | +1 | +1 | +1 | 8 | 0 | 0 | +1 | +1 | +1 | +1 | −1 | −1 |
| Row 2 | 1 | 0 | 0 | +1 | −1 | +1 | +1 | +1 | +1 | 9 | 0 | 0 | +1 | −1 | +1 | +1 | −1 | −1 |
| Row 3 | 2 | 1 | 1 | +1 | +1 | +1 | +1 | +1 | +1 | 10 | 1 | 1 | +1 | +1 | +1 | +1 | −1 | −1 |
| Row 4 | 3 | 1 | 1 | +1 | −1 | +1 | +1 | +1 | +1 | 11 | 1 | 1 | +1 | −1 | +1 | +1 | −1 | −1 |
| Row 5 | 4 | 0 | 0 | +1 | +1 | +1 | −1 | +1 | −1 | 12 | 0 | 0 | +1 | +1 | +1 | −1 | −1 | +1 |
| Row 6 | 5 | 0 | 0 | +1 | −1 | +1 | −1 | +1 | −1 | 13 | 0 | 0 | +1 | −1 | +1 | −1 | −1 | +1 |
| Row 7 | 6 | 1 | 1 | +1 | +1 | +1 | −1 | +1 | −1 | 14 | 1 | 1 | +1 | +1 | +1 | −1 | −1 | +1 |
| Row 8 | 7 | 1 | 1 | +1 | −1 | +1 | −1 | +1 | −1 | 15 | 1 | 1 | +1 | −1 | +1 | −1 | −1 | +1 |

Figure 14:
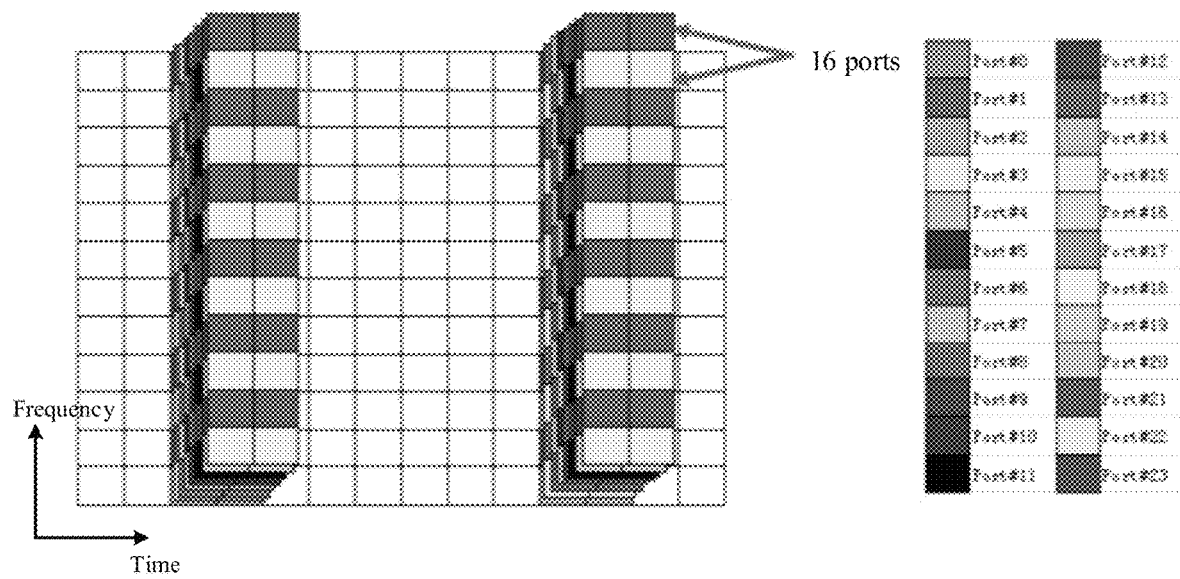
FIG. 14 shows a second example (DMRS mode 1+add overhead 2) of a schematic view of DMRS resource allocation according to the third embodiment of this disclosure.

FIG. 14 illustrates a second example (DMRS mode 1+add overhead 2) of a schematic view of DMRS resource allocation according to the third embodiment of this disclosure. Similar to FIG. 2A and FIG. 2B, in FIG. 14, horizontal axis represents time domain resource, vertical axis represents frequency domain resource, each grid represents one RE (Resource Element), that is, one OFDM (Orthogonal Frequency Division Multiplexing) symbol, and DMRS signal corresponding to different user equipment is represented by different grey scale in the drawing.

FIG. 14 illustrates a case of transmitting DMRS signals by using four OFDM symbols. In FIG. 14, at the same time domain resource location, DMRS signals corresponding to two ports are transmitted alternately by different REs (comb REs). This is same as in the FIG. 2A and the FIG. 2B. Further, in FIG. 14, the DMRS signals are transmitted by four OFDM symbols, and the four OFDM symbols are divided into two groups, and positions of two OFDM symbols in each group are continuous. Therefore, 8 DMRS signals are shown overlapped at the same time domain resource location. These eight DMRS signals are distinguished by orthogonal sequence, that is, cyclic shift and time domain OCC. In contrast, in FIG. 2B, four DMRS signals are shown overlapped at the same time domain resource location. Therefore, in FIG. 14, the DMRS signals of sixteen The data bounded by rows 1-8 and columns 6 to 9 and 15 to 18 represent DMRS configuration parameter adding overhead according to the third embodiment of this disclosure, and here, the positions of four OFDM symbols are discontinuous.

Figure 15:
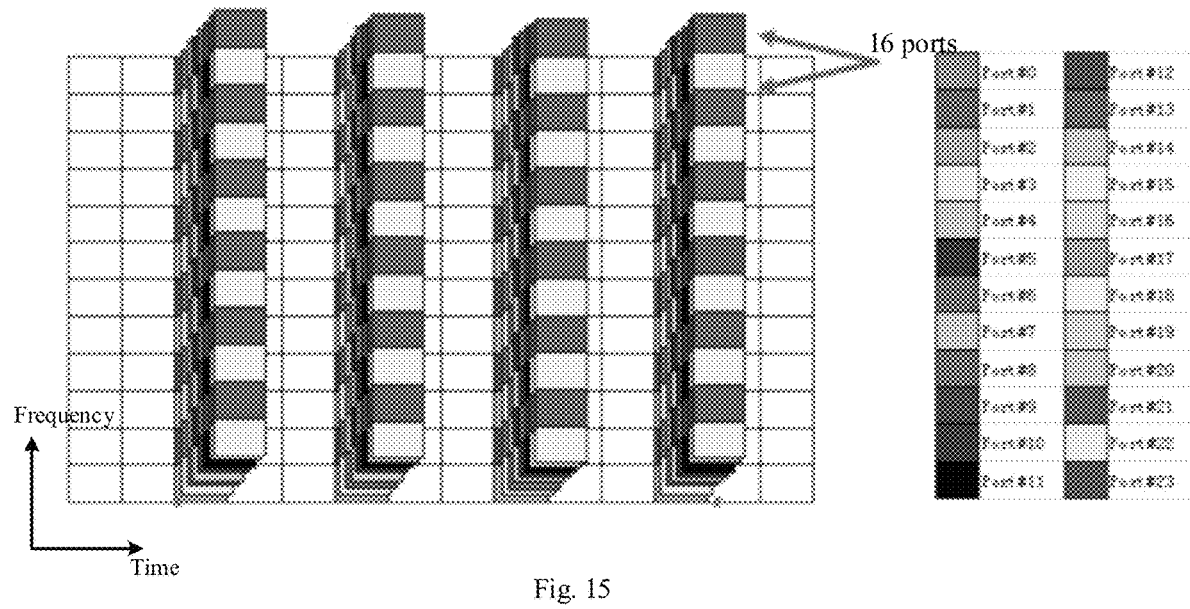
FIG. 15 shows a third example (DMRS mode 1+add overhead 3) of a schematic view of DMRS resource allocation according to the third embodiment of this disclosure.

FIG. 15 illustrates a third example (DMRS mode 1+add overhead 3) of a schematic view of DMRS resource allocation according to the third embodiment of this disclosure. Similar to FIG. 2A and FIG. 2B, in FIG. 15, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

FIG. 15 illustrates a case of transmitting DMRS signals by using four OFDM symbols. In FIG. 15, at the same time domain resource location, DMRS signals corresponding to two ports are transmitted alternately by different REs (comb REs). This is same as in the FIG. 2A and the FIG. 2B. Further, in FIG. 15, the DMRS signals are transmitted by four discontinuous OFDM symbols. Therefore, eight DMRS signals are shown overlapped at the same time domain resource location. These eight DMRS signal are distinguished by orthogonal sequence, that is, cyclic shift and time domain OCC. In contrast, in FIG. 2B, four DMRS signals are shown overlapped at the same time domain resource location. Therefore, in FIG. 15, the DMRS signals of sixteen user equipment can be supported to be transmitted at same time domain resource. As compared to FIG. 2B, the number of supportable user equipment is increased.

Figure 16:
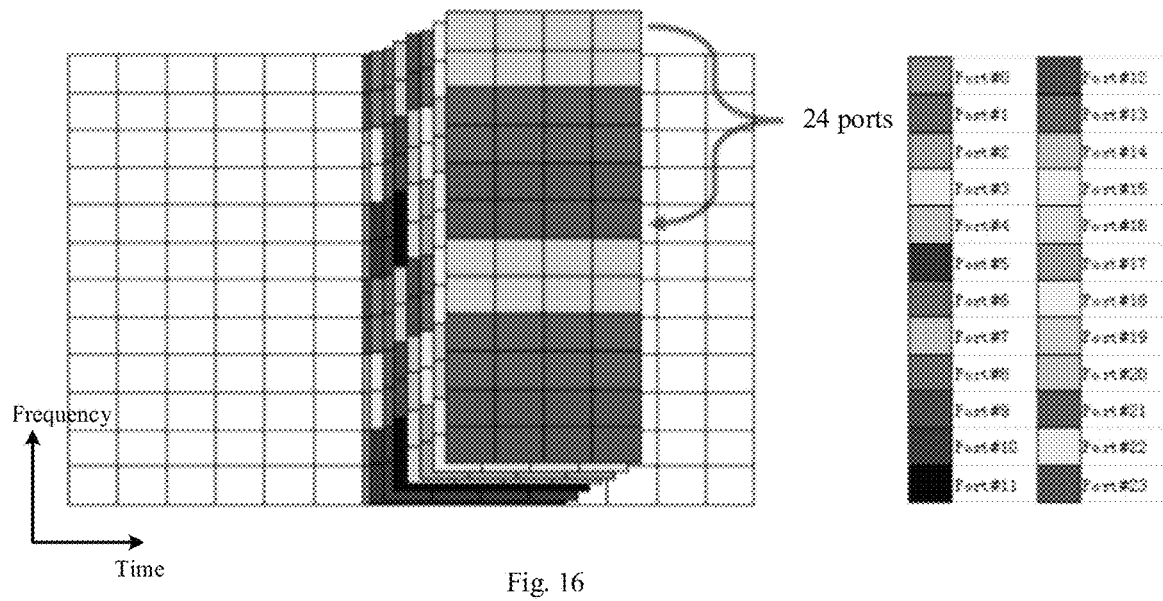
FIG. 16 shows a fourth example (DMRS mode 2+add overhead 1) of a schematic view of DMRS resource allocation according to the third embodiment of this disclosure.

DMRS configuration parameter table adding overhead (the first example) based on the DMRS mode 2 is shown in the following table 10:

FIG. 16 illustrates a case of transmitting DMRS signals by using four OFDM symbols. In FIG. 16, at the same time domain resource location, DMRS signals corresponding to one port are transmitted by adjacent two REs (adjacent REs), and DMRS signals corresponding to three ports are transmitted alternately every two REs. This is same as in the FIG. 3A and the FIG. 3B. Further, in FIG. 16, the DMRS signals are transmitted by four continuous OFDM symbols, thus, eight DMRS signal are shown overlapped at the same time

TABLE 10

| | Column 1 $\bar{p}$ | Column 2 CDM group | Column 3 $\Delta$ | Column 4 $w_f(k')$ k' = 0 | Column 5 k' = 1 | Column 6 $w_t(l')$ l' = 0 | Column 7 l' = 1 | Column 8 l' = 2 | Column 9 l' = 3 | Column 10 $\bar{p}$ | Column 11 CDM group | Column 12 $\Delta$ | Column 13 $w_f(k')$ k' = 0 | Column 14 k' = 1 | Column 15 $w_t(l')$ l' = 0 | Column 16 l' = 1 | Column 17 l' = 2 | Column 18 l' = 3 |
|---|---|---|---|---|---|---|---|---|---|---|---|---|---|---|---|---|---|---|
| Row 1 | 0 | 0 | 0 | +1 | +1 | +1 | +1 | +1 | +1 | 12 | 0 | 0 | +1 | +1 | +1 | +1 | −1 | −1 |
| Row 2 | 1 | 0 | 0 | +1 | −1 | +1 | +1 | +1 | +1 | 13 | 0 | 0 | +1 | −1 | +1 | +1 | −1 | −1 |
| Row 3 | 2 | 1 | 2 | +1 | +1 | +1 | +1 | +1 | +1 | 14 | 1 | 2 | +1 | +1 | +1 | +1 | −1 | −1 |
| Row 4 | 3 | 1 | 2 | +1 | −1 | +1 | +1 | +1 | +1 | 15 | 1 | 2 | +1 | −1 | +1 | +1 | −1 | −1 |
| Row 5 | 4 | 2 | 4 | +1 | +1 | +1 | +1 | +1 | +1 | 16 | 2 | 4 | +1 | +1 | +1 | +1 | −1 | −1 |
| Row 6 | 5 | 2 | 4 | +1 | −1 | +1 | +1 | +1 | +1 | 17 | 2 | 4 | +1 | −1 | +1 | +1 | −1 | −1 |
| Row 7 | 6 | 0 | 0 | +1 | +1 | +1 | −1 | +1 | −1 | 18 | 0 | 0 | +1 | +1 | +1 | −1 | −1 | +1 |
| Row 8 | 7 | 0 | 0 | +1 | −1 | +1 | −1 | +1 | −1 | 19 | 0 | 0 | +1 | −1 | +1 | −1 | −1 | +1 |
| Row 9 | 8 | 1 | 2 | +1 | +1 | +1 | −1 | +1 | −1 | 20 | 1 | 2 | +1 | +1 | +1 | −1 | −1 | +1 |
| Row 10 | 9 | 1 | 2 | +1 | −1 | +1 | −1 | +1 | −1 | 21 | 1 | 2 | +1 | −1 | +1 | −1 | −1 | +1 |
| Row 11 | 10 | 2 | 4 | +1 | +1 | +1 | −1 | +1 | −1 | 22 | 2 | 4 | +1 | +1 | +1 | −1 | −1 | +1 |
| Row 12 | 11 | 2 | 4 | +1 | −1 | +1 | −1 | +1 | −1 | 23 | 2 | 4 | +1 | −1 | +1 | −1 | −1 | +1 |

The data bounded by rows 1-12 and columns 6 to 9 and 15 to 18 represent DMRS configuration parameters adding overhead according to the third embodiment of this disclosure, and here, the positions of four OFDM symbols are continuous.

FIG. 16 illustrates a fourth example (DMRS mode 2+add overhead 1) of a schematic view of DMRS resource allocation according to the third embodiment of this disclosure. Similar to FIG. 3A and FIG. 3B, in FIG. 16, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

domain resource location. These eight DMRS signals are distinguished by orthogonal sequence, that is, cyclic shift and time domain OCC. In contrast, in FIG. 3B, four DMRS signals are shown overlapped at the same time domain resource location. Therefore, in FIG. 16, the DMRS signals of twenty-four user equipment can be supported to be transmitted at same time domain resource. As compared to FIG. 3B, the number of supportable user equipment is increased.

DMRS configuration parameter table adding overhead (the fifth example) based on the DMRS mode 2 is shown in the following table 11:

TABLE 11

| | Column 1 $\bar{p}$ | Column 2 CDM group | Column 3 $\Delta$ | Column 4 $w_f(k')$ k' = 0 | Column 5 k' = 1 | Column 6 $w_t(l')$ $\bar{l} = l_1$ l' = 0 | Column 7 l' = 1 | Column 8 $\bar{l} = l_2$ l' = 0 | Column 9 l' = 1 | Column 10 $\bar{p}$ | Column 11 CDM group | Column 12 $\Delta$ | Column 13 $w_f(k')$ k' = 0 | Column 14 k' = 1 | Column 15 $w_t(l')$ $\bar{l} = l_1$ l' = 0 | Column 16 l' = 1 | Column 17 $\bar{l} = l_2$ l' = 0 | Column 18 l' = 1 |
|---|---|---|---|---|---|---|---|---|---|---|---|---|---|---|---|---|---|---|
| Row 1 | 0 | 0 | 0 | +1 | +1 | +1 | +1 | +1 | +1 | 12 | 0 | 0 | +1 | +1 | +1 | +1 | −1 | −1 |
| Row 2 | 1 | 0 | 0 | +1 | −1 | +1 | +1 | +1 | +1 | 13 | 0 | 0 | +1 | −1 | +1 | +1 | −1 | −1 |
| Row 3 | 2 | 1 | 2 | +1 | +1 | +1 | +1 | +1 | +1 | 14 | 1 | 2 | +1 | +1 | +1 | +1 | −1 | −1 |
| Row 4 | 3 | 1 | 2 | +1 | −1 | +1 | +1 | +1 | +1 | 15 | 1 | 2 | +1 | −1 | +1 | +1 | −1 | −1 |
| Row 5 | 4 | 2 | 4 | +1 | +1 | +1 | +1 | +1 | +1 | 16 | 2 | 4 | +1 | +1 | +1 | +1 | −1 | −1 |
| Row 6 | 5 | 2 | 4 | +1 | −1 | +1 | +1 | +1 | +1 | 17 | 2 | 4 | +1 | −1 | +1 | +1 | −1 | −1 |
| Row 7 | 6 | 0 | 0 | +1 | +1 | +1 | −1 | +1 | −1 | 18 | 0 | 0 | +1 | +1 | +1 | −1 | −1 | +1 |
| Row 8 | 7 | 0 | 0 | +1 | −1 | +1 | −1 | +1 | −1 | 19 | 0 | 0 | +1 | −1 | +1 | −1 | −1 | +1 |
| Row 9 | 8 | 1 | 2 | +1 | +1 | +1 | −1 | +1 | −1 | 20 | 1 | 2 | +1 | +1 | +1 | −1 | −1 | +1 |
| Row 10 | 9 | 1 | 2 | +1 | −1 | +1 | −1 | +1 | −1 | 21 | 1 | 2 | +1 | −1 | +1 | −1 | −1 | +1 |
| Row 11 | 10 | 2 | 4 | +1 | +1 | +1 | −1 | +1 | −1 | 22 | 2 | 4 | +1 | +1 | +1 | −1 | −1 | +1 |
| Row 12 | 11 | 2 | 4 | +1 | −1 | +1 | −1 | +1 | −1 | 23 | 2 | 4 | +1 | −1 | +1 | −1 | −1 | +1 |

The data bounded by rows 1-12 and columns 6 to 9 and 15 to 18 represent DMRS configuration parameters adding overhead according to the third embodiment of this disclosure, here, four OFDM symbols are divided into two groups, and positions of two OFDM symbols in each group are continuous.

Figure 17:
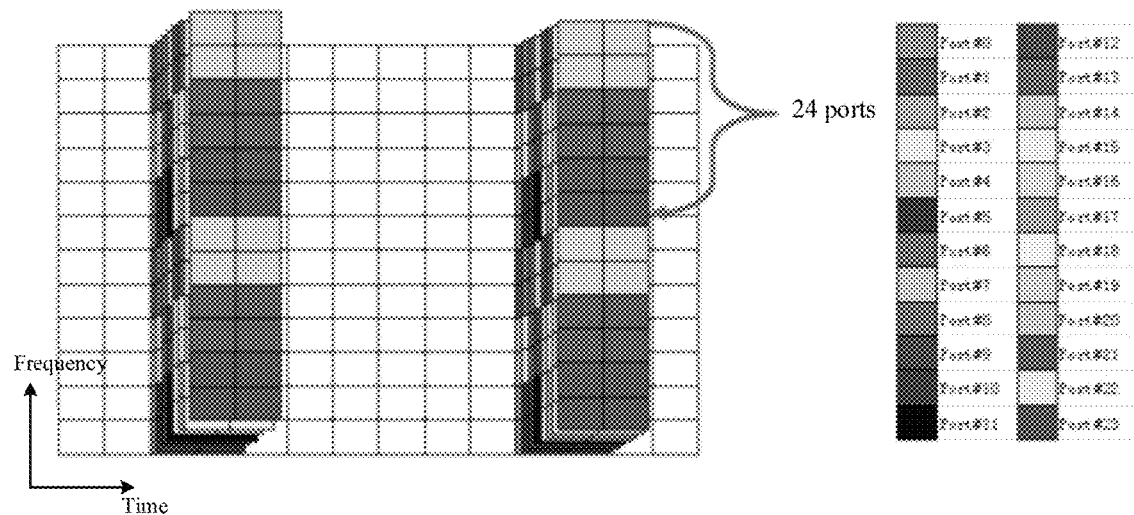
FIG. 17 shows a fifth example (DMRS mode 2+add overhead 2) of a schematic view of DMRS resource allocation according to the third embodiment of this disclosure.

FIG. 17 illustrates a fifth example (DMRS mode 2+add overhead 2) of a schematic view of DMRS resource allocation according to the third embodiment of this disclosure. Similar to FIG. 3A and FIG. 3B, in FIG. 17, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

FIG. 17 illustrates a case of transmitting DMRS signals by using four OFDM symbols. In FIG. 17, at the same time domain resource location, DMRS signals corresponding to two ports are transmitted alternately by different REs (comb REs). This is same as in the FIG. 3A and the FIG. 3B. Further, in FIG. 17, the DMRS signals are transmitted by four OFDM symbols, and the four OFDM symbols are divided into two groups, and positions of two OFDM symbols in each group are continuous. Therefore, eight DMRS signal are shown overlapped at the same time domain resource location. These eight DMRS signals are distinguished by orthogonal sequence, that is, cyclic shift and time domain OCC. In contrast, in FIG. 3B, four DMRS signals are shown overlapped at the same time domain resource location. Therefore, in FIG. 17, the DMRS signals of twenty-four user equipment can be supported to be transmitted at same time domain resource. As compared to FIG. 3B, the number of supportable user equipment is increased.

DMRS configuration parameter table adding overhead (the sixth example) based on the DMRS mode 2 is shown in the following table 12:

sure. Similar to FIG. 3A and FIG. 3B, in FIG. 18, horizontal axis represents time domain resource, vertical axis represents frequency domain resource, each grid represents one RE (Resource Element), that is, one OFDM (Orthogonal Frequency Division Multiplexing) symbol, and DMRS signals corresponding to different user equipment are represented by different grey scale in the drawing.

Figure 18:
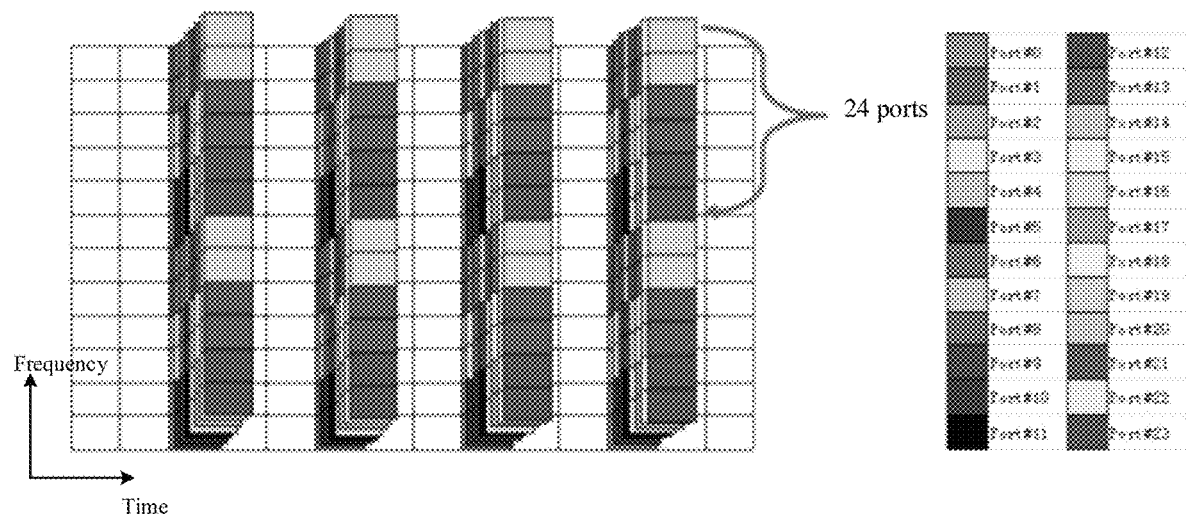
FIG. 18 illustrates a sixth example (DMRS mode 2+add overhead 3) of a schematic view of DMRS resource allocation according to the third embodiment of this disclosure.

FIG. 18 illustrates a case of transmitting DMRS signals by using four OFDM symbols. In FIG. 18, at the same time domain resource location, DMRS signals corresponding to two ports are transmitted alternately by different REs (comb REs). This is same as in the FIG. 3A and the FIG. 3B. Further, in FIG. 18, the DMRS signals is transmitted by four discontinuous OFDM symbols. Therefore, eight DMRS signals are shown overlapped at the same time domain resource location. These eight DMRS signals are distinguished by orthogonal sequence, that is, cyclic shift and time domain OCC. In contrast, in FIG. 3B, four DMRS signals are shown overlapped at the same time domain resource location. Therefore, in FIG. 18, the DMRS signals of twenty-four user equipment can be supported to be transmitted at same time domain resource. As compared to FIG. 3B, the number of supportable user equipment is increased.

Several DMRS modes according to the third embodiment in case that Transform pre-coding is disabled are described hereinbefore. Since the PN sequence supports the DMRS mode 1 and the DMRS mode 2, the time domain resource for transmitting the DMRS signal can be added based on the DMRS mode 1 or the DMRS mode 2. On the other hand, in case that transition pre-coding is enabled, since the ZC sequence only supports the DMRS mode 1 but does not support the DMRS mode 2, the time domain resource for transmitting the DMRS signal can only be added based on the DMRS mode 1.

It can be seen that by the third embodiment, in the transmission of the DMRS signal, the maximum number of supportable user equipment would be twenty-four.

TABLE 12

| Column | Column 2 | Column | Column 4 $w_f(k')$ | Column 5 | Column 6 | Column 7 $w_t(l')$ | Column 8 | Column 9 | Column | Column 11 | Column | Column 13 $w_f(k')$ | Column 14 | Column 15 | Column 16 | Column 17 $w_t(l')$ | Column 18 |
|---|---|---|---|---|---|---|---|---|---|---|---|---|---|---|---|---|---|
| $\overline{p}$ | CDM group | $\Delta$ | k'=0 | k'=1 | $\overline{l}=l_1$ l'=0 | $\overline{l}=l_2$ l'=0 | $\overline{l}=l_3$ l'=0 | $\overline{l}=l_4$ l'=0 | $\overline{p}$ | CDM group | $\Delta$ | k'=0 | k'=1 | $\overline{l}=l_1$ l'=0 | $\overline{l}=l_2$ l'=0 | $\overline{l}=l_3$ l'=0 | $\overline{l}=l_4$ l'=0 |
| Row 1  | 0  | 0 | 0 | +1 | +1 | +1 | +1 | +1 | +1 | 12 | 0 | 0 | +1 | +1 | +1 | +1 | −1 | −1 |
| Row 2  | 1  | 0 | 0 | +1 | −1 | +1 | +1 | +1 | +1 | 13 | 0 | 0 | +1 | −1 | +1 | +1 | −1 | −1 |
| Row 3  | 2  | 1 | 2 | +1 | +1 | +1 | +1 | +1 | +1 | 14 | 1 | 2 | +1 | +1 | +1 | +1 | −1 | −1 |
| Row 4  | 3  | 1 | 2 | +1 | −1 | +1 | +1 | +1 | +1 | 15 | 1 | 2 | +1 | −1 | +1 | +1 | −1 | −1 |
| Row 5  | 4  | 2 | 4 | +1 | +1 | +1 | +1 | +1 | +1 | 16 | 2 | 4 | +1 | +1 | +1 | +1 | −1 | −1 |
| Row 6  | 5  | 2 | 4 | +1 | −1 | +1 | +1 | +1 | +1 | 17 | 2 | 4 | +1 | −1 | +1 | +1 | −1 | −1 |
| Row 7  | 6  | 0 | 0 | +1 | +1 | +1 | −1 | +1 | −1 | 18 | 0 | 0 | +1 | +1 | +1 | −1 | −1 | +1 |
| Row 8  | 7  | 0 | 0 | +1 | −1 | +1 | −1 | +1 | −1 | 19 | 0 | 0 | +1 | −1 | +1 | −1 | −1 | +1 |
| Row 9  | 8  | 1 | 2 | +1 | +1 | +1 | −1 | +1 | −1 | 20 | 1 | 2 | +1 | +1 | +1 | −1 | −1 | +1 |
| Row 10 | 9  | 1 | 2 | +1 | −1 | +1 | −1 | +1 | −1 | 21 | 1 | 2 | +1 | −1 | +1 | −1 | −1 | +1 |
| Row 11 | 10 | 2 | 4 | +1 | +1 | +1 | −1 | +1 | −1 | 22 | 2 | 4 | +1 | +1 | +1 | −1 | −1 | +1 |
| Row 12 | 11 | 2 | 4 | +1 | −1 | +1 | −1 | +1 | −1 | 23 | 2 | 4 | +1 | −1 | +1 | −1 | −1 | +1 |

The data bounded by rows 1-12 and columns 6 to 9 and 15 to 18 represent DMRS configuration parameter adding overhead according to the third embodiment of this disclosure, and here, the positions of four OFDM symbols are discontinuous.

FIG. 18 illustrates a sixth example (DMRS mode 2+increase overhead 3) of a schematic view of DMRS resource allocation according to the third embodiment of this disclo- Then, at step S1203, information indicating the allocating mode and information indicating the parameters are transmitted to the plurality of user equipment.

Fourth Embodiment

In the fourth embodiment, the first embodiment and the second embodiment described above can be combined. In particular, the DMRS signals of different user equipment can be transmitted in a more sparse manner in the frequency domain, that is, at the same time of transmitting the DMRS signals of more user equipment in the frequency domain, users occupying same time frequency resource are divided into a plurality of groups, and orthogonal DMRS signals are transmitted in same group, and non-orthogonal DMRS signals are transmitted between different groups, that is, more non-orthogonal user equipment groups are added on same time frequency resource.

Thus, by extending in the frequency domain and the code domain simultaneously, transmission of DMRS signal of more user equipment can be supported.

Fifth Embodiment

In the fifth embodiment, the first embodiment and the third embodiment described above can be combined. In particular, the DMRS signals of different user equipment can be transmitted in a sparser manner in the frequency domain, that is, at the same time of transmitting the DMRS signal of more user equipment in the frequency domain, resource locations for transmitting DMRS are added in the time domain.

Thus, by extending in the frequency domain and the time domain simultaneously, transmission of DMRS signal of more user equipment can be supported.

Sixth Embodiment

In the sixth embodiment, the first embodiment, the second embodiment and the third embodiment described above can be combined. In particular, the DMRS signals of different user equipment can be transmitted in a more sparse manner in the frequency domain, that is, at the same time of transmitting the DMRS signal of more user equipment in the frequency domain, users occupying same time frequency resource are divided into a plurality of groups, and orthogonal DMRS signals are transmitted in same group, and non-orthogonal DMRS signals are transmitted between different groups, that is, more non-orthogonal user equipment groups are added on same time frequency resource, and resource locations for transmitting DMRS are added in the time domain.

Thus, by extending in the frequency domain, the code domain and the time domain simultaneously, transmission of DMRS signal of more user equipment can be supported.

Though several cases of combining embodiments are described in the fourth embodiment to the sixth embodiment, this disclosure is not limited thereto. Those skilled in the art can understand that any other combination of the first to the third embodiment is possible, and should fall into range of this disclosure.

Hereinbefore, the resource allocation methods according to the first to the third embodiment of this invention are described detailed with reference to FIG. 1 to FIG. 18 respectively. Next, a base station according to an embodiment of the invention is described with reference to FIG. 19.

Figure 19:
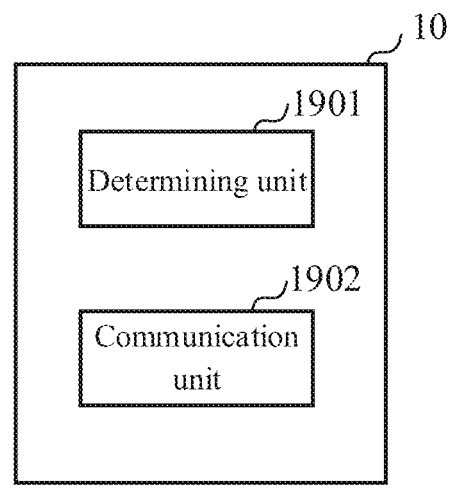
FIG. 19 is a functional block diagram illustrating configuration of a base station according to an embodiment of the invention.

As shown in FIG. 19, a base station 10 includes a determining unit 1901 and a communication unit 1902.

The determining unit 1901 is for determining an allocating mode of resource required for transmitting a plurality of demodulation reference signals and parameters for generating the plurality of demodulation reference signals, herein, the plurality of demodulation reference signals are corresponding to a plurality of user equipment respectively, and the allocating mode is able to support transmitting the plurality of demodulation reference signals at same time domain resource, and the parameters are able to make demodulation reference signals transmitted at same time frequency resource to be distinguished from each other.

The communication unit 1902 is used for transmitting information indicating the allocating mode and information indicating the parameters to the plurality of user equipment.

According to the first embodiment, the determining unit 1901 is further configured to determine the following allocating mode: transmitting the plurality of demodulation reference signals with same time domain resource and different frequency domain resource.

According to the second embodiment, the determining unit 1901 is further configured to determine the following allocating mode: dividing a plurality of user equipment corresponding to a plurality of demodulation reference signals occupying same time frequency resource into different groups, therein, demodulation reference signals corresponding to respective user equipment in same group are orthogonal, and demodulation reference signals corresponding to respective user equipment in different group are non-orthogonal.

In the second embodiment, in determined allocating mode, same time domain resource is allocated to different group; and in a same group, different frequency domain resource is allocated to different user equipment to transmit the demodulation reference signal.

According to the third embodiment, the determining unit 1901 is further configured to determine the following allocating mode: extending time domain resource for transmitting the plurality of demodulation reference signals, and herein, the communication unit 1902 is further configured to transmit indication information for indicating whether the time domain resource is extended to the plurality of user equipment.

In the third embodiment, the communication unit 1902 is further configured to transmit information indicating the extended time domain resource locations to the plurality of user equipment. The extended time domain resource locations are new specified time domain resource locations, or the extended time domain resource locations are multiplexed time domain resource locations by which the demodulation reference signals are transmitted currently.

And, in the base station according to this disclosure, the first to the third embodiment can be combined.

Since the base station according to this disclosure is completely corresponding to the method described above, in order to avoid redundancy, the detail thereof is no longer described detailed.

Hardware Configuration

Further, the block diagram used in the above description of the embodiments illustrates blocks in unit of function. These functional blocks (structural unit) are implemented by any combination of hardware and/or software. Further, implementation manners of the respective functional blocks are not particularly limited. That is, the respective functional blocks can be implemented by one apparatus combined physically and/or logically, and can be implemented by two or more apparatus by directly and/or indirectly connecting (for example, by wired and/or wireless connection) the two or more apparatus separated physically and/or logically.

Figure 20:
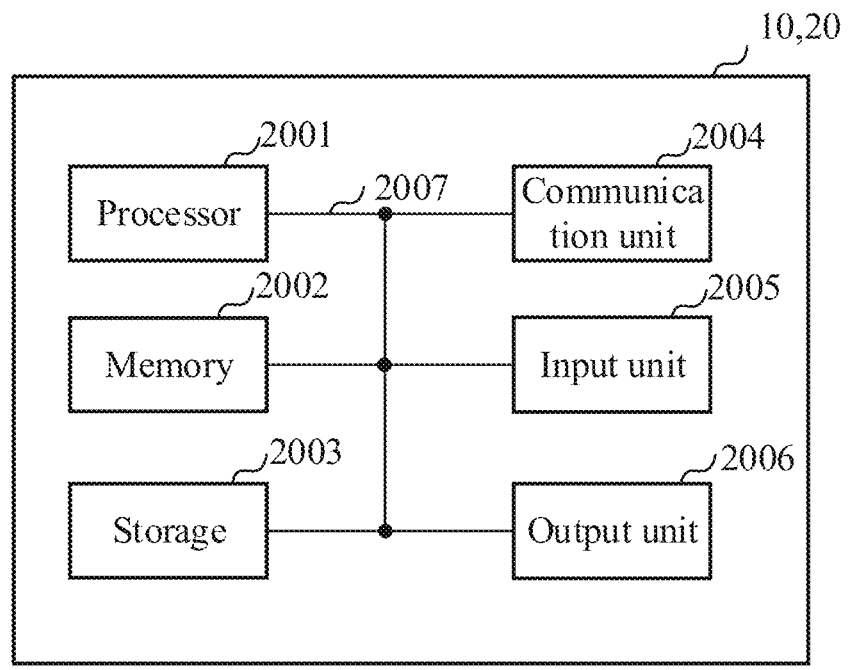
FIG. 20 is a view illustrating an example of hardware configuration of a base station and user equipment involved in the embodiments of this disclosure.

For example, the base station, the user equipment or the like in an embodiment of this disclosure can function as a computer for executing processing of wireless communication method of this disclosure. FIG. 20 is a view illustrating an example of hardware configuration of a base station and user equipment involved in the embodiments of this disclosure. The above-described base station 10 and user equipment 20 can be composed by a computer device including a processor 2001, a memory 2002, storage 2003, a communication device 2004, an input device 2005, an output device 2006 and a bus 2007 or the like physically.

Further, in the following description, word such as "unit" can be replaced by circuit, apparatus, device or the like. The hardware configurations of the base station 10 and the user equipment 20 may include the respective devices as shown in one or more drawings, and may not include some of the devices.

For example, the processor 2001 is only shown as one, but there may be a plurality of processors. Further, the processing may be executed by one processor, and the processing may be executed by more than one processor simultaneously, sequentially or by adopting other method. Further, the processor 2001 may be installed by more than one chip.

For example, the respective functions in the base station 10 and the user equipment 20 are implemented in the following manner: making the processor 2001 to execute operation to control communication executed by the communication unit 2004 and control read and/or write of the data in the memory 2002 and the storage 2003 by reading predetermined software (program) into hardware such as the processor 2001, the memory 2002 or the like.

For example, the processor 2001 makes an operating system to operate so as to control the computer in integrity. The processor 2001 can be composed of a central processing unit (CPU) including an interface with periphery devices, a control device, an arithmetic device and a register or the like. For example, the above-described determining unit 1901 can be implemented by the processor 2001.

Further, the processor 2001 read program (program code), software module, data or the like from the storage 2003 and/or the communication unit 2004 to the memory 2002, and execute various kinds of processing accordingly. As program, a program making the computer to execute at least a part of actions described in the above embodiments can be adopted. For example, the determining unit 1901 of the user equipment 10 can be implemented by a control program stored in the memory 2002 and operated by the processor 2001, and for other functional block, they may also be implemented similarly. The memory 2002 is computer readable recording medium, for example, is composed by at least one of read only memory (ROM), erasable programmable ROM (EPROM), electrically EPROM (EEPROM), random access memory (RAM) or other appropriate storage medium. The memory 2002 may also be referred as a register, a cache, a primary memory (primary storage device) or the like. The memory 2002 may store executable program (program code), software module or the like for implementing the wireless communication method involved in an embodiment of this disclosure.

Storage 2003 is a computer readable recording medium, for example, is at least one of flexible disk, floppy disk (registered trade mark), magneto-optical disc (for example, CD-ROM (Compact Disc ROM) or the like), digital versatile disc, Blue-ray (registered trade mark) optical disk, removable disk, hard disk drive, smart card, flash device (for example, card, stick, key driver), magnetic strip, database, server or other appropriate storage medium. The storage 2003 may also be referred as auxiliary storage device.

The communication unit 2004 is a hardware (transmitting and receiving apparatus) for executing communication between computers through wired and/or wireless network, for example, it also be referred as network apparatus, network controller, network card, communication module or the like. The communication unit 2004 may include high frequency switch, duplexer, filter, frequency combiner or the like for implementing for example frequency division duplex (FDD) and/or time division duplex (TDD). For example, the above-described communication unit 1902 can be implemented by the communication unit 2004.

The input unit 2005 is an input apparatus receiving input from outside (for example, a keyboard, a mouse, a microphone, a switch, a button, a sensor or the like). The output unit 2006 is an output apparatus for outputting to outside (for example, a display, a speaker, a light emitting diode (LED) lamp or the like). Further, the input unit 2005 and the output unit 2006 may also be an integral structure (for example, a touch control panel).

Further, the respective devices such as the processor 2001, the memory 2002 or the like are connected by the bus 2007 for communicating information. The bus 2007 may be composed of a single bus, and may also be composed of different buses between devices.

Further, the base station 10 and the user equipment 20 may include hardware such as a microprocessor, a digital signal processor (DSP), an application specific integrated circuit (ASIC), a programmable logic device (PLD), a field programmable gate array (FPGA) or the like, and may implement a part or all of the respective functional blocks by the hardware. For example, the processor 1001 can be installed through at least one of the hardware.

Variant Embodiment

Further, the word related to the explanation in this specification or the word required for understanding this specification may be interchanged with word having same or similar meaning. For example, a channel and/or a symbol may also be signal (signaling). Also, signal may also be information. Reference signal may also be referred as RS for short, and may also be referred as pilot, pilot signal or the like according to applied standard. Also, component carrier (CC) may also be referred as cell, frequency carrier, carrier frequency or the like.

Also, a radio frame may be composed of one or more period (frame) in time domain. Each of the one or more period (frame) constituting the radio frame may also be referred as a sub-frame. In turn, the sub-frame may be composed of one or more slots in time domain. The sub-frame may be a fixed time length (for example, 1 ms) independent of parameter configuration (numerology).

In turn, the slot may be composed of one or more symbols (orthogonal frequency division multiplexing (OFDM) symbol, single carrier frequency division multiple access (SC-FDMA) symbol or the like) in time domain. Also, the slot may be a time unit based on parameter configuration. Also, the slot may include a plurality of micro-slots. The respective micro-slot may be composed one or more symbol in time domain. Also, the micro-slot may be referred as sub-slot.

All of the radio frame, the sub-frame, the slot, the micro-slot and the symbol represent time unit at the time of transmitting signal. The radio frame, the sub-frame, the slot, the micro-slot and the symbol may also use other names corresponding thereto. For example, one sub-frame may be referred to as transmission time interval (TTI), and a plurality of continuous sub-frames may also be referred as a TTI, and a slot or a micro-slot may also be referred as TTI. That is, the sub-frame and/or the TTI may be the sub-frame (1 ms) in the conventional LTE, and may also be a period shorter than 1 ms (for example, 1-13 symbols), and may also be a period longer than 1 ms. Further, unit representing TTI may also be referred as a time slot, a micro-slot or the like rather than a sub-frame.

Here, for example, TTI refers to a minimal time unit scheduled in wireless communication. For example, in LTE system, the base station schedules for allocating wireless resource (band width, transmitting power or the like available in the respective user equipment) in a unit of TTI for respective user equipment. Also, a definition of the TTI is not limited thereto.

The TTI may be a transmitting time unit of a data packet (a transport block) channel encoded, a code block and/or a code word, and may also be a processing unit of schedule, link adaptation or the like. Further, at the time of giving the TTI, a time interval (for example, number of symbols) mapping with the transport block, the code block and/or the code word may also be actually shorter than the TTI.

Further, when a slot or a micro-slot is referred as the TTI, more than one TTI (that is, more than one slot or more than one micro-slot) may also become minimal time unit for schedule. Further, number of slots (number of micro-slots) constituting the minimal time unit for schedule may be controlled.

A TTI having a time length of 1 ms may be referred as a regular TTI (TTI in LTE Rel.8-12), a standard TTI, a long TTI, a regular sub-frame, a standard sub-frame or a long sub-frame or the like. A TTI shorter than the regular TTI may be referred as a compressed TTI, a short TTI, and a partial TTI (partial or fractional TTI), a compressed sub-frame, a short sub-frame, a micro-slot or a sub-slot or the like.

Further, the long TTI (for example, the regular TTI, the sub-frame or the like) may be replaced by a TTI having a time length of more than 1 ms, and the short TTI (for example, the compressed TTI or the like) may be replaced by a TTI having a time length that is shorter than that of the long TTI and more than 1 ms.

A resource block (RB) is a resource allocation unit in the time domain and the frequency domain, and may include one or more continuous secondary carriers (sub-carriers) in the frequency domain. Further, the RB may include one or more symbols in the time domain, and may also be a length of a slot, a micro-slot, a sub-frame or a TTI. A TTI, a sub-frame may be composed of one or more resource blocks respectively. Also, one or more RB may also be referred as physical resource block (PRB, physical RB). sub-carrier group (SCG). resource element group (REG), PRG pair, RB pair or the like.

Further, the resource block may be composed of one or more resource elements (RE). For example, a RE may be a wireless resource region of a sub-carrier and a symbol.

Further, structures of the above-described radio frame, sub-frame, slot, micro-slot and symbol or the like are only example. For example, structures such as number of sub-frames included in the radio frame, number of slots of each sub-frame or radio frame, number of micro-slots included in the slot, number of symbols and RBs included in the slot or the micro-slot, number of sub-carriers included in the RB, and number of symbols in the TTI, length of the symbol, length of cyclic prefix (CP) or the like can be modified variously.

Further, information, parameter or the like explained in this specification may be represented by absolute value, and may also be represented by relative value to a specified value, and may also be represented by other corresponding information. For example, the wireless resource may be indicated by specified index. Further, formula using these parameters may also be different from that disclosed explicitly in this specification.

Names for the parameters in the specification are not restrictive in any aspect. For example, various channels (physical uplink control channel (PUCCH), physical down-link control channel (PDCCH) or the like) and information units may be recognized by any appropriate name, and therefore, various names allocated to these various channels and information units are not restrictive in any aspect.

Information, signal or the like explained in this specification may be represented by using any one of various different techniques. For example, data, command, instruction, information, signal, bit, symbol, chip or the like possibly described in all of the above-described explanation may be represented by voltage, current, electromagnetic wave, magnetic field or magnetic particle, optical field or photon or their arbitrary combination.

Further, the information, the signal or the like may be outputted from upper layer to lower layer, and/or from lower layer to upper layer. The information, the signal or the like may be inputted or outputted through a plurality of network nodes.

The information, the signal or the like inputted or outputted may be stored in specific site (for example, memory), and may also be managed through a managing table. The information, the signal or the like inputted or outputted may by covered, updated or supplemented. The information, the signal or the like outputted may be deleted. The information, the signal or the like inputted may be forwarded to other devices.

A notification of the information is not limited to mode/implementation mode explained in this specification, and may also be implemented by other methods. For example, the notification of the information may be implemented through physical layer signaling (for example, downlink control information (DCI), uplink control information (UCI)), upper layer signaling (for example, wireless resource control (RRC) signaling, broadcast information (master information block (MIB), system information block (SIB) or the like), medium access control (MAC) signaling, other signal or their combination.

Further, the physical layer signaling may be referred as L1/L2 (the first layer/the second layer) control information (L1/L2 control signal), L1 control information (L1 control signal) or the like. Further, the RRC signaling may also be referred as RRC message, for example, may be RRC connection setup message, RRC connection reconfiguration message or the like. Further, the MAC signaling may be notified through MAC control element (MAC CE) for example.

Further, notification of specified information (for example, notification of "being X") is not limited to be implemented explicitly, and may also be implemented implicitly (for example, by not carry out the notification of the specified information, or by notification of other information).

Regarding decision, it may be carried out by a value represented by 1 bit (0 or 1), and may also be carried out by true or false value (Boolean value) Boolean value represented by true or false, and may also be carried out by comparison of numerical value (for example, comparison with specified value).

No matter whether software is referred as software, firmware, middleware, micro code, hardware description language, or as other names, it should be broadly defined as referring to command, command set, code, code segment, program code, program, subprogram, software module, application, software application, software package, routine, subroutine, object, executable file, executing thread, step, function or the like.

Further, software, command, information or the like can be transmitted or received through transmission medium. For example, when software is transmitted by using wire techniques (coaxial cable, optical cable, twisted pair, digital subscriber line (DSL) or the like) and/or wireless techniques (infrared ray, microwave or the like) from network site, server or other remote resource, these wire techniques and/or wireless techniques are included in definition of transmission medium.

Such word of "system" and "network" used in this specification can be interchanged.

In this specification, such word of "base station (BS)", "eNB", "gNB", "cell", "sector", "cell group", "carrier" and "component carrier" can be interchanged. The base station is sometimes referred as word such as fixed station, NodeB, eNodeB (eNB), access point, transmitting point, receiving point, femto cell, micro-cell or the like.

The base station may accommodate one or more (for example, three) cells (also referred to as sector). When the base station accommodates a plurality of cells, entire coverage area of the base station can be divided into a plurality of smaller regions, and each smaller regions can provide communication service by base station sub-system (for example, indoor mini base station (radio frequency remote radio head (RRH))). Such "word" of "cell" or "sector" refers to a part or all of the coverage area of the base station and/or the base station sub-system providing communication service in the coverage area.

In this specification, such word of "mobile station (MS)", "user terminal", "user equipment (UE)" and "terminal" can be interchanged. The base station is sometimes referred as word such as fixed station, NodeB, eNodeB (eNB), access point, transmitting point, receiving point, femto cell, micro-cell or the like.

The mobile station is sometimes referred as subscriber station, mobile unit, subscriber unit, wireless unit, remote unit, mobile apparatus, wireless apparatus, wireless communication apparatus, remote apparatus, mobile subscriber station, access terminal, mobile terminal, wireless terminal, remote terminal, handset, user agent, mobile client, client or some other appropriate word by those skilled in the art.

Further, the base station in this specification can be replaced by the user equipment. For example, for a structure in which communication between the base station and the user equipment is replace with communication between a plurality of user equipment (D2D, Device-to-Device), the respective modes/implementation modes of this disclosure can be applied. At this time, functions of the above-described base station 10 can be regarded as functions of the user equipment 20. Further, such word of "up" and "down" can be replaced with "side". For example, up channel may also be replaced with side channel.

Similarly, the user equipment in this specification may also be replaced with base station. At this time, functions of the above-described user equipment 20 can be regarded as functions of the base station 10.

In this specification, specific activities configured to be carried out by the base station are sometimes carried out by an upper node thereof. It is obvious that, in a network having base station and composed of one or more network nodes, various activities carried out for communication with terminal may be carried out through the base station, more than one network nodes beside the base station (for example, mobility management entity (MME), serving gateway (S-GW) or the like can be considered, but it is not limited thereto) or their combination.

The respective modes/implementation modes explained in this specification can be used independently, or may also be used in combination with each other, and may also be used by switching in implementation procedure. Further, processing steps, sequence, flow chart or the like of the respective modes/implementation modes explained in this specification can change order as long as there is no contradiction. For example, regarding to the method explained in this specification, various step units are shown in an exemplified sequence, but they are not limited to the given specific sequence.

The respective modes/implementation modes explained in this specification can be applied to systems employing long term evolution (LTE), advanced long term evolution (LTE-A, LTE-Advanced), beyond long term evolution (LTE-B, LTE-Beyond), super 3rd generation mobile communication system (SUPER 3G), advanced international mobile communication (IMT-Advanced), 4th generation mobile communication system (4G), 5th generation mobile communication system (5G), future radio access (FRA), new radio access technology (New-RAT), new radio (NR), new radio access (NX), future generation radio access (FX), global system for mobile communications (GSM (registered trade mark)}, code division multiple access 2000 (CDMA2000), ultra mobile broadband (UMB), IEEE 802.11 (Wi-Fi (registered trade mark)), IEEE 802.16 (WiMAX (registered trade mark} }, IEEE 802.20, Ultra-Wide Band (UWB), Bluetooth (registered trade mark), other appropriate wireless communication method and/or next generation system expanded based on them.

Such term of "according to" used in this specification does not mean "according to only" unless recorded explicitly in other paragraphs. In other words, such term of "according to" refers to both of "according to only" and "according to at least".

Any reference to units using term of "first", "second" in this specification is not to limit the number or the sequence of these units. These terms can be used for a convenient method for distinguishing two or more units to be used in this specification. Therefore, reference to a first unit and a second unit does not mean that only two units can be used or the first unit has to prior to the second unit in some form.

Such word of "decide (determine) (determining)" in this specification sometimes includes various activities. For example, regarding to "decide (determine)", calculate (calculating), compute (computing), process (processing), derive (deriving), investigate (investigating), look up (looking up) (for example, looking up in a table, a database or other data structure), ascertain (ascertaining) or the like can be regarded as "decide (determine)". Further, regarding to "decide (determine)", receive (receiving) (for example, receive information), transmit (transmitting) (for example, transmit information), input (inputting), output (outputting), access (accessing) (for example, access data in the memory) or the like can be regarded as "decide (determine)". Further, regarding to "decide (determine)", resolve (resolving), select (selecting), choose (choosing), establish (establishing), compare (comparing) or the like can be regarded as to "decide (determine)". That is, regarding to "decide (determine)", some activities may be regarded as to "decide (determine)".

Such word of "connected", "coupled" used in this specification or their any variance refers to any direct or indirect connection or couple between two or more units, and may include the following case: there is one or more intermediate unit between two units "connected" or "coupled". Couple or connection between units can be physical, and may also be logical, or may also be combination of the two. For example, "connect" may also be replaced with "access". At the time of being used in this specification, the two units can be regarded as being electrically connected by using one or more than one wire, wire cable and/or print, and as some non-restrictive and non-exhausted example, being "connected" or "coupled" by using electromagnetic energy having a wavelength in a radio frequency region, a microwave region and/or a light (both of visible light and invisible light) region or the like.

When the word "include (including)", "comprise (comprising)" and their variance is used in this specification or claim, these word and the word "have" are all in open form. Further, word "or" used in this specification or claim is not exclusive or.

Hereinbefore, this disclosure is described detailed, and for those skilled in the art, it is obvious that this disclosure is not limited to the implementation modes explained in this specification. This disclosure can be implemented in modified and altered mode without departing from spirit and range of this disclosure determined by the claims. Therefore, the description in this specification is for exemplified explanation, and does not have any restrictive meaning for this disclosure.

The invention claimed is:

1. A resources allocation method of demodulation reference signals executed by a base station, comprising:
   determining an allocating mode of resource required for transmitting a plurality of demodulation reference signals and parameters for generating the plurality of demodulation reference signals, wherein, the plurality of demodulation reference signals are corresponding to a plurality of user equipment respectively, and the allocating mode is able to support transmitting the plurality of demodulation reference signals at same time domain resource, and the parameters are able to make demodulation reference signals transmitted at same time frequency resource to be distinguished from each other; and
   transmitting information indicating the allocating mode and information indicating the parameters to the plurality of user equipment,
   wherein, the step of determining the allocating mode of resource required for transmitting the plurality of demodulation reference signals includes determining the following allocating mode:
   dividing the plurality of user equipment corresponding to the plurality of demodulation reference signals occupying the same time frequency resource into different groups,
   wherein, the demodulation reference signals corresponding to the respective user equipment in same group are orthogonal, and the demodulation reference signals corresponding to the respective user equipment of different groups are non-orthogonal.

2. The resources allocation method according to claim 1, wherein, the step of determining the allocating mode of resource required for transmitting the plurality of demodulation reference signals further includes determining the following allocating mode:
   transmitting the plurality of demodulation reference signals with same time domain resource and different frequency domain resources.

3. The resources allocation method according to claim 1, wherein, in the determined allocating mode,
   same time domain resource is allocated to different group; and
   different frequency domain resource is allocated to different user equipment in same group to transmit the demodulation reference signals.

4. The resources allocation method according to claim 1, wherein, the step of determining the allocating mode of resource required for transmitting the plurality of demodulation reference signals further includes determining the following allocating mode:
   extending the time domain resources for transmitting the plurality of demodulation reference signals, and
   wherein, the method further includes:
   transmitting information indicating whether the time domain resources are extended to the plurality of user equipment.

5. The resources allocation method according to claim 4, further comprises:
   transmitting information indicating extended time domain resource locations to the plurality of user equipment.

6. The resources allocation method according to claim 5, wherein, the extended time domain resource locations are new specified time domain resource locations, or the extended time domain resource locations are multiplexed time domain resource locations of demodulation reference signals transmitted currently.

7. A base station for executing resource allocation of demodulation reference signals, comprising:
   a determining unit for determining an allocating mode of resource required for transmitting a plurality of demodulation reference signals and parameters for generating the plurality of demodulation reference signals, wherein, the plurality of demodulation reference signals are corresponding to a plurality of user equipment respectively, and the allocating mode is able to support transmitting the plurality of demodulation reference signals at same time domain resource, and the parameters are able to make demodulation reference signals transmitted at same time frequency resource to be distinguished from each other; and
   a communication unit for transmitting information indicating the allocating mode and information indicating the parameters to the plurality of user equipment,
   wherein the determining unit is further configured to determining the following allocating mode:
   dividing the plurality of user equipment corresponding to the plurality of demodulation reference signals occupying the same time frequency resource into different groups,
   wherein, the demodulation reference signals corresponding to the respective user equipment in same group are orthogonal, and the demodulation reference signals corresponding to the respective user equipment of different groups are non-orthogonal.

8. The base station according to claim 7, wherein the determining unit is further configured to determining the following allocating mode:
   transmitting the plurality of demodulation reference signals with same time domain resource and different frequency domain resources.

9. The base station according to claim 7, wherein, in the determined allocating mode,
   same time domain resource is allocated to different group; and different frequency domain resources are allocated to different user equipment in same group to transmit the demodulation reference signals.

10. The base station according to claim 7, wherein, the determining unit is further configured to determine the following allocating mode:
extending the time domain resources for transmitting the plurality of demodulation reference signals, and
wherein, the communication unit is further configured to:
transmit information indicating whether the time domain resources are extended to the plurality of user equipment.

11. The base station according to claim 10, wherein, the communication unit is further configured to:
transmit information indicating extended time domain resource locations to the plurality of user equipment.

12. The base station according to claim 11, wherein, the extended time domain resource locations are new specified time domain resource locations, or the extended time domain resource locations are multiplexed time domain resource locations of demodulation reference signals transmitted currently.

\* \* \* \* \*